Nov. 21, 1972   R. A. HEATON ET AL   3,703,363
METHOD AND APPARATUS FOR MAKING GLASS CONTAINERS
Filed April 1, 1970   14 Sheets-Sheet 1

INVENTORS
RICHARD A. HEATON
BY JAMES D. MALLORY
J. R. Nelson and
E. J. Holler
ATTORNEYS INVENTORS
RICHARD A. HEATON
BY JAMES D. MALLORY
J. R. Nelson and
E. J. Holler
ATTORNEYS Nov. 21, 1972  R. A. HEATON ET AL  3,703,363
METHOD AND APPARATUS FOR MAKING GLASS CONTAINERS
Filed April 1, 1970  14 Sheets-Sheet 3

INVENTORS
RICHARD A. HEATON
BY JAMES D. MALLORY
J. P. Nelson and
E. J. Holler
ATTORNEYS

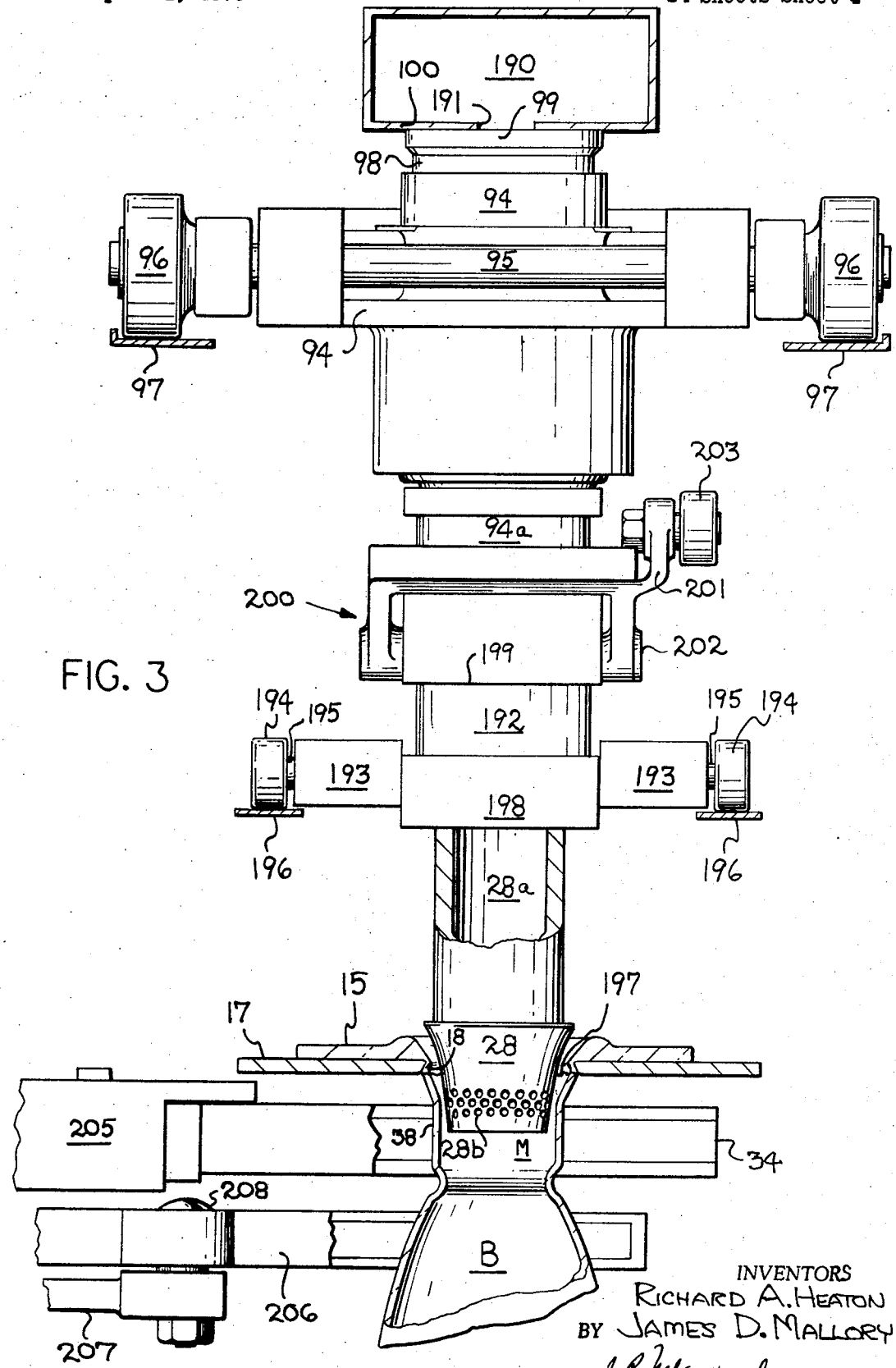

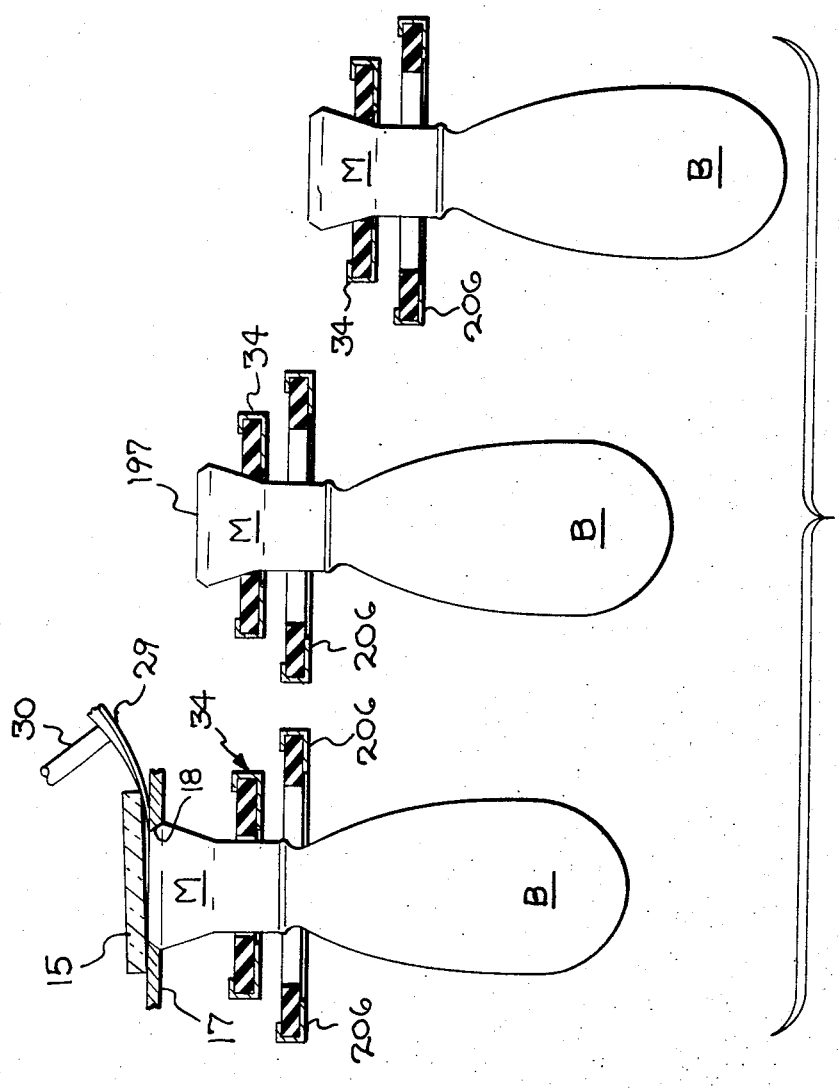

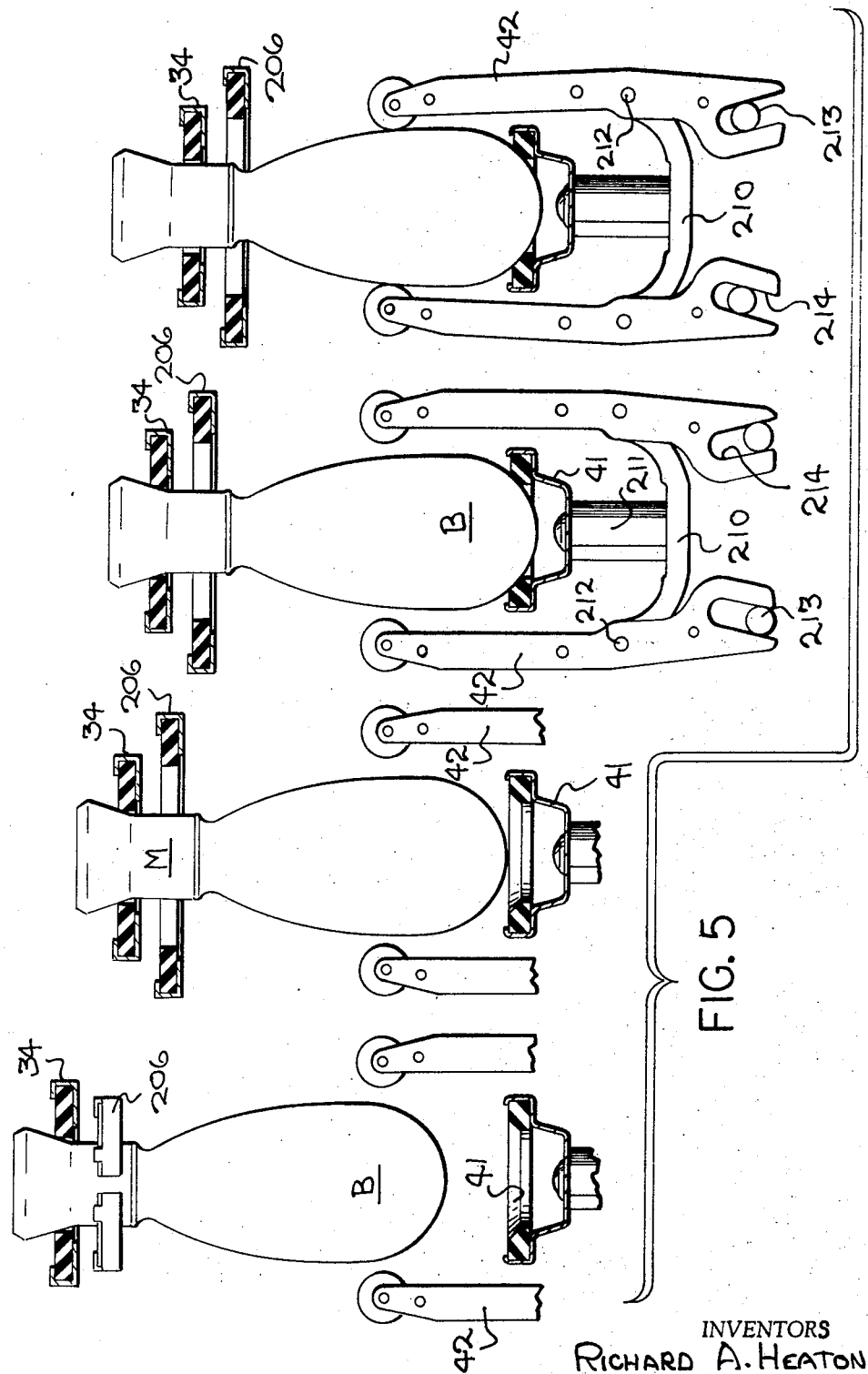

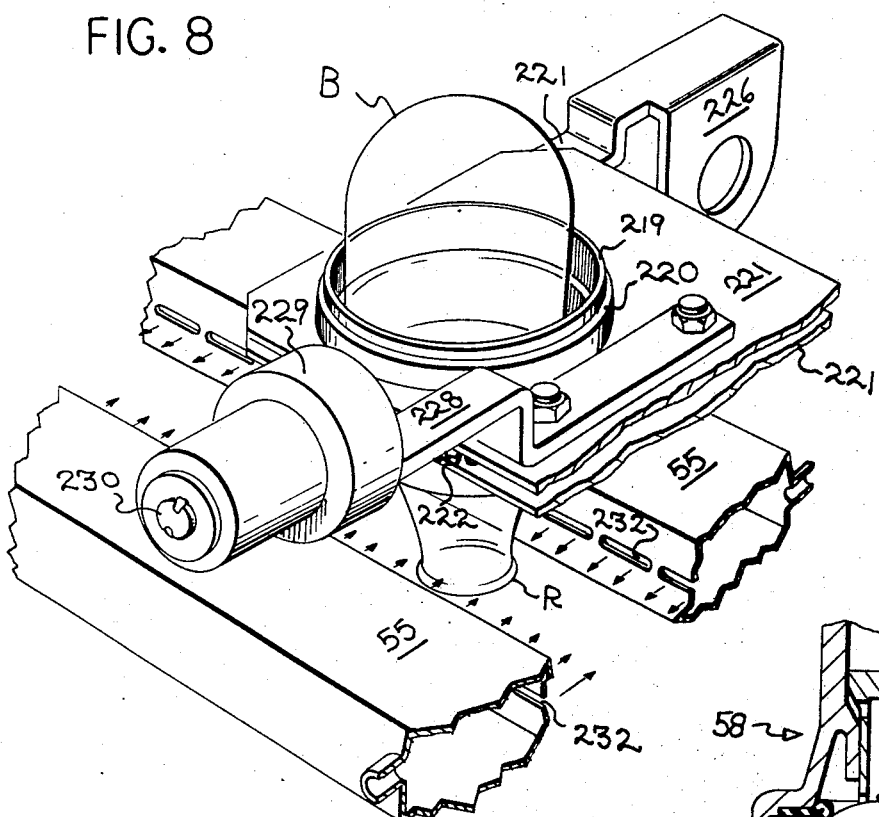
FIG. 8
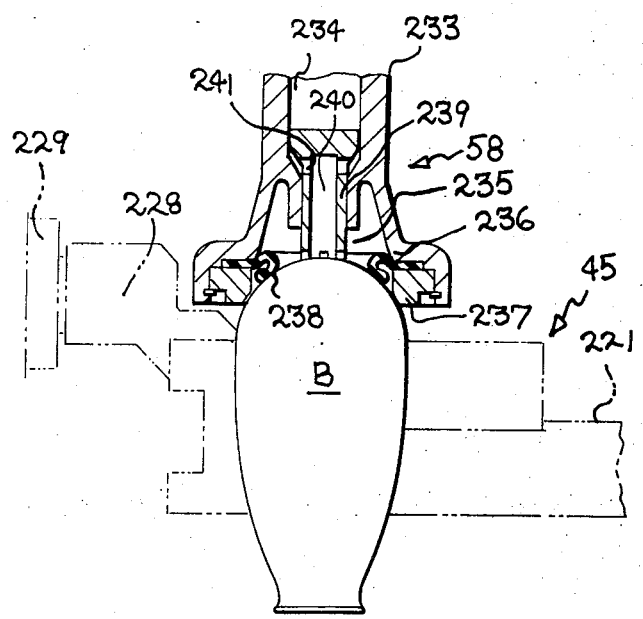
FIG. 9
FIG. 10
INVENTORS
RICHARD A. HEATON
BY JAMES D. MALLORY
ATTORNEYS Nov. 21, 1972  R. A. HEATON ET AL  3,703,363
METHOD AND APPARATUS FOR MAKING GLASS CONTAINERS
Filed April 1, 1970  14 Sheets-Sheet 13

INVENTORS
RICHARD A. HEATON
BY  JAMES D. MALLORY
J.R. Nelson and
E.J. Holler
ATTORNEYS Nov. 21, 1972 R. A. HEATON ET AL 3,703,363
METHOD AND APPARATUS FOR MAKING GLASS CONTAINERS
Filed April 1, 1970
14 Sheets-Sheet 14

INVENTORS
RICHARD A. HEATON
BY JAMES D. MALLORY
J. R. Nelson and
E. J. Holler
ATTORNEYS

United States Patent Office 3,703,363
Patented Nov. 21, 1972

3,703,363
METHOD AND APPARATUS FOR MAKING GLASS CONTAINERS
Richard A. Heaton, Toledo, and James D. Mallory, Maumee, Ohio, assignors to Owens-Illinois, Inc.
Filed Apr. 1, 1970, Ser. No. 24,721
Int. Cl. C03b 9/10, 9/12
U.S. Cl. 65—67
39 Claims

ABSTRACT OF THE DISCLOSURE

The invention pertains to a manufacturing system for producing multi-part containers in which one part of glass is assembled with a plastic part to form a final composite container. The glass part is manufactured from a continuous ribbon of molten material drawn from a glass furnace and the glass in the ribbon is formed at equally spaced longitudinal distances therealong and maintained with conveyors moving at a constant velocity throughout the process during which successive finishing operations are performed on the glass container. After the glass is fed from the furnace, successive operations are performed while the glass progressively cools to: (a) form a continuous ribbon, (b) shape successive hollow containers from the ribbon, inspect and eject defective containers from the ribbon, (c) sever the containers from the ribbon and simultaneously prevent entry of foreign particles into them, (d) move the containers by a moving transfer conveyor to a burn-off machine and apply a surface treatment to the containers while in transit, (e) convey them through a linear burn-off device to simultaneously remove a waste moile portion from the outer end of the article and form the mouth, thereafter inspect and eject defective ones, (f) transfer the glass containers with a finished mouth or rim to a heat treating machine and successively heat and cool the necks and finishes of the containers, (g) transfer the heated containers to an assembly machine and, in transfer, inspect the containers, apply a surface treatment thereto, and reject defective containers, and (h) assemble and bond a plastic cup-like base element onto the bottom end of the containers to form a composite container.

The invention also includes apparatus combined with a glass ribbon machine. The apparatus includes a transfer machine that receives ware from the ribbon machine after crack-off; a burn-off machine of a unique, linear type, which receives ware from the transfer machine and by thermal means removes an outer end moile from the glassware and forms a bead type finish; a linear heat-treat machine that tempers the end portion of the ware near the newly formed bead finish; a transfer and inspection machine which removes ware from the heat-treat machine and rejects any defective ware; and a composite assembly machine that finishes the composite container by applying or uniting a plastic element onto the surface of the glassware near its bottom end. The machines are synchronized in phase and speed by a unique system.

BACKGROUND OF THE INVENTION

The present invention relates to a continuous, in-line production of glass containers, or like articles, wherein a continuous, moving line production of articles is established at the glass furnace and carried out through multiple steps on the line with successive containers formed and finished at linear spacings therealong.

The invention includes a new method of production of glass articles inclusive of other components, such as hereinafter described, as well as a new combination of elements to make up an integrated production system therefor that functions at a higher rate of production with greater reliability and automatic control compared to present day methods and machinery.

The present day method of forming glass containers utilizes one of two techniques: (1) The "suction" process in which separate charges of molten glass are drawn by vacuum from a pool of glass in a furnace forebay and introduced into a blank mold where the charge is shaped into a hollow parison by air pressure and the shaped parison is transferred from the blank mold to a final mold where it is blown to shape of a container. The containers are released from the molds and fed in random fashion to and through an annealing lehr, and after annealing they are surface treated and inspected for defects. (2) The "flow" process in which a stream of molten glass is fed from an orifice of the glass furnace and lengths of glass are cut from the leading end of the stream to form separate charges ("gobs") that are deposited in a blank mold. The gobs are shaped in the blank mold to a hollow parison by either a pressing plunger (press-and-blow) or by air pressure (blow-and-blow). Shaped parisons are next transferred to a final blow mold and expanded by air pressure to the shape of the container. The containers are transferred from the molds to a conveyor by take-out mechanism and carried in random fashion to and through an annealing lehr. They are subsequently inspected and/or surface treated.

In present day practice, glass envelopes (bulbs) for incandescent electric lamps are manufactured by the "ribbon" process. The machine for making articles by the ribbon process, herein referred to as "ribbon machine" or "glass ribbon machine" is typically disclosed in U.S. Pat. 1,790,397 to Wood, and pages 356–8 of Handbook of Glass Manufacturing, compiled and edited by Fay V. Tooley (1953).

This general forming process is utilized in the present invention; however the lamp making process is distinctly different. In the ribbon process, molten glass is fed from a glass furnace as a stream that flows onto a pair of counter rotating forming rolls. This device, the forming rolls, shapes the stream into a continuous ribbon of glass having raised portions or "paddies" in longitudinally spaced relationship therealong. The ribbon, with the spaced paddies uppermost, is laid onto an endless chain of orifice plates moving away from the rolls in a horizontal plane. The ribbon formation and movement of orifices are timed such that the paddies overlay the orifices and the ribbon is continuously conveyed in linear fashion. While moving forward, the glass ribbon is progressively worked by the succession of manipulations for: (a) sagging glass from each paddy through the orifice, thereby anchoring the ribbon on the orifice conveyor, (b) puffing the glass by an overhead blow pipe moving with the ribbon to form a parison suspended from the ribbon, (c) enclosing the parison in a traveling paste mold and revolving the mold about the axis of the parison while the blow pipe internally pressurizes the glass to shape the hollow article, (d) opening the molds and moving them away from the articles, the articles being formed to bulb shape with an upper tubular moile portion adjacent the socket end of the bulb, (e) advancing the articles by the ribbon to a point where they are severed therefrom and deposited in random fashion on a conveyor, and (f) conveying the articles into and through an annealing lehr, the moile being severed at the mouth of the lamp prior to or at the assembly of the electrical elements to complete the lamp.

Although certain prior art patents illustrate the use of modified ribbon machine structures for making containers, the concepts therein set forth have not been commercially successful to the present. Examples of such prior concepts are set forth in U.S. Pats. to W. L. Van Ness, 1,943,195, and L. D. Soubier, 2,280,167, neither of which are notorious in the glass container industry today.

SUMMARY OF THE INVENTION

In U.S. Pats. Nos. 3,372,826 and 3,482,724 of R. A. Heaton, co-inventor herein, a novel form of container is disclosed which comprises a thin walled, light weight glass vessel having a bulbous bottom end and a contiguous wall that is arcuately contoured throughout the upper portion of the body to a mouth provided by an annular rim or finish. The glass vessel is united with a cylindrical, cup-like base member telescoped over the bulbous end of the vessel and assembled therewith to form a composite container with a suporting base or bottom that provides the assembled container with upright stability.

By the present invention, a novel method and manufacturing system is provided for the production of such container and other glass products that are adaptable to be so manufactured to their final shape and in their production finished to include the uniting of separate component parts. The present invention sets forth as its objects the following:

(1) Provide a high speed manufacturing system for the novel two-part composite container.

(2) Provide a glass manufacturing line with positive handling of each container starting with its shaping and carrying through the finishing operations until a final container is produced ready for shipping.

(3) Provide a glass ribbon machine with positive take-out of the produced ware.

(4) Provide a glass ribbon machine operating in combination with auxiliary sub-systems comprising glass burn-off, glass heat treating, assembly to continuously produce a finished composite product.

(5) Provide a glass manufacturing process for containers in which slow speed annealing of the glass is eliminated, thereby pacing the process by the rate of formation of the containers on the forming machine, and wherein long residence times of the product in the steps of the manufacturing process is eliminated thereby enhancing the central controlability of the overall process.

(6) Provide a glass container manufacturing system wherein metal-glass contact is reduced in shaping and handling on both the inside and outside glass surfaces, there preserving in the finished container more of the pristine strength of the glass.

(7) To utilize the natural compressive stress layer of thin paste molded blown ware and preserve the same to produce a glass container having a higher strength-to-weight ratio than heretofore.

(8) To provide a manufacturing system for glass products that is readily adaptable to automation and computer process control to a greater extent than present processes.

(9) To provide a container making process in which a prefabricated, predecorated base element or fitment is merged into the glass container processing line and there united onto the glass container body to produce a final decorated composite container which eliminates extra handling of the glass container is decorating same.

(10) Provide an in-line process for performing the succession of steps of shaping a glass container, burn off a moile end portion and form a finish rim on the container, heat treat the glass at the finish rim and adjacent thereto and assemble with the container a stable base element.

(11) Provide inspection of the container in the process of making same, the inspection elements being a link in automatic integrated control over quality of finished product in the process.

(12) To provide for in-line elimination of foreign particles from entry into the formed container before finishing steps are undertaken thereby preventing loose glass and chips from entering the container.

(13) To provide for better elimination of defects in ware produced by selecting and disposing of defective ware in close proximity to production stage where defect occurs.

(14) Provide for surface treatment and/or coatings to be applied on the glass container in the production process.

(15) Provide a system in which the glass is tied together in an in seratim process line from the point where the glass issues from the fused parent body of glass in the furnace until the composite article is completed in manufacture at the end of the production line.

(16) Provide a multiple machine process synchronized by an integrated drive system wherein machines of the seratim line are paced or synchronized one to the other from the pace established by the orifice plate conveyor of the ribbon machine.

(17) Provide for successively trimming and finishing a glass container in a continuous process line.

(18) Provide an in-line manufacturing process producing containers at hitherto unattainable rates in a broad range of production output on the order of 400 to 1000 bottles per minute.

(19) Provide such a high production process for composite containers to produce a light, strong, durable, decorated container capable of packaging pressurized product, such as carbonated beverages or beer.

(20) Provide a manufacturing process for containers with considerably fewer potential defects in the ware over processes heretofore utilized in glass container maufacture.

(21) Provide a coordinated manufacturing process for composite containers wherein separate components for the package are manufactured on a glass production line and a plastic production line and the glass and plastic products merged at the final stages of the production line handling the glass product to assemble the two products as the composite glass-plastic container; and

(22) Provide a glass manufacturing process for a container in which the shaping, finishing and treating of the glass occurs during the time the glass progressively cools from its molten temperature to a much lower temperature near room temperature, and during which the glass, in each of these stages, is under positive control and handling.

Other objects and features of the invention will become apparent by reference to the following specification and to the drawings.

On the drawings:

FIG. 3 is a section elevational view of the pressurizer apparatus for elimination of loose glass particles or foreign matter from the glassware on the ribbon machine as it is severed from the ribbon.

FIG. 4 is a diagrammatic view of the transfer of a molded container to the first transfer machine.

FIG. 5 is a diagrammatic view of the transfer of the molded ware (with integral moile portion) to the chucks of the burn-off machine.

FIG. 8 is a perspective view, with parts broken away, showing an annulus holder and its carriage on the heat treating machine.

FIG. 9 is a sectional elevational view of the second transfer machine vacuum chuck picking up glassware from the annulus holder (shown in phantom line) on the heat treating machine.

FIG. 10 is a sectional elevational view, in part schematic, of the glassware carried by the vacuum chuck through a surface treating section on the second transfer machine.

THE MANUFACTURING SYSTEM

Figure 1:
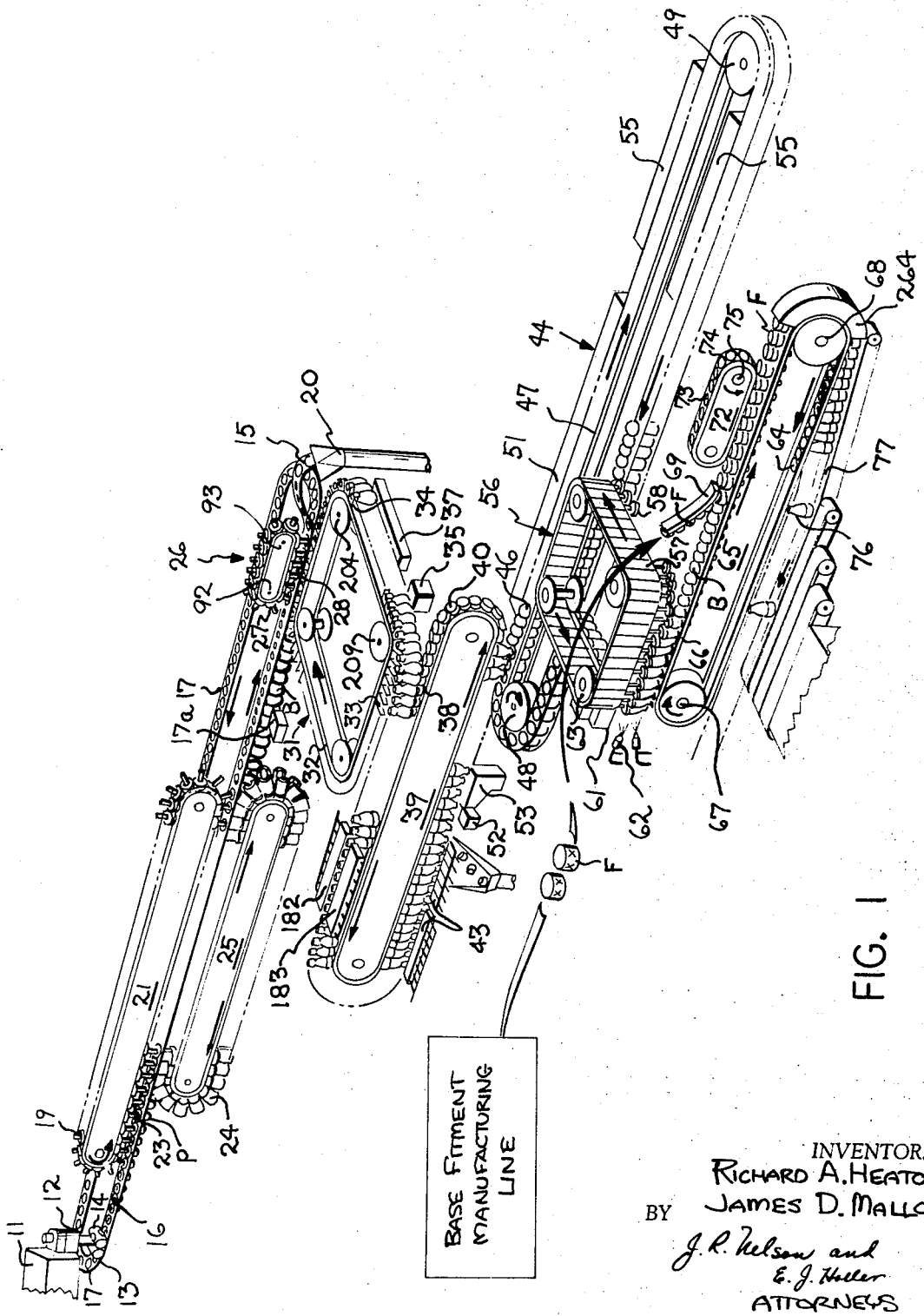
FIG. 1 is a partially diagrammatic view of the manufacturing system of the invention.
Figure 2:
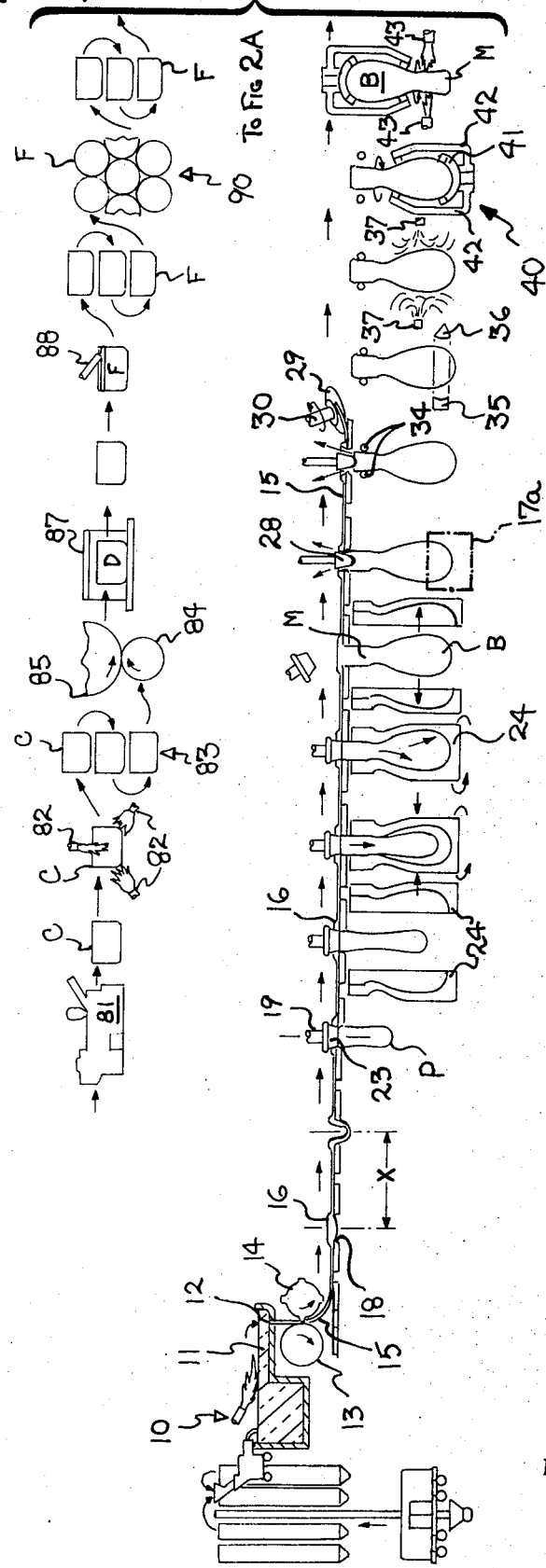
FIGS. 2 and 2A are, collectively, a flow diagram of the process of the invention.
Figure 2A:
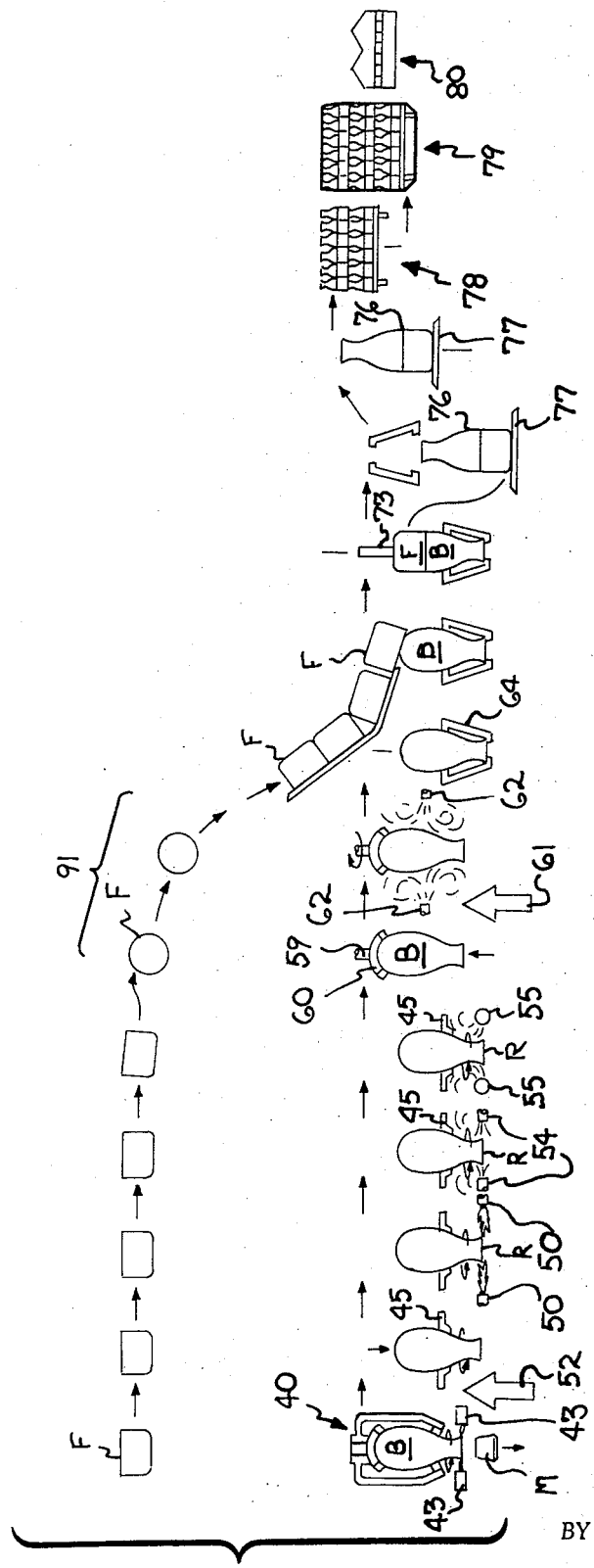

Referring to FIGS. 1, 2 and 2A a typical glass melting furnace 10 transforms the raw batch ingredients, such as a known soda-lime glass batch, into a fined molten glass that flows continuously into forehearth 11 having therein a ribbon feeder orifice 12. The glass composition may be a flint or known colored glass composition, such as used in making containers, lamp envelopes, and the like. Glass flows by gravity as a continuous stream from orifice 12 between a pair of counter-rotating ribbon forming rolls 13 and 14, the latter being pocketed on its periphery to shape the stream to a generally flattened glass ribbon 11 with raised, spaced, upstanding paddies 16 of a more or less truncated conical shape. The spacing between vertical centers of paddies 16 is the "X" dimension. The ribbon is deposited on a horizontal traveling orifice plate chain 17 of a ribbon machine, such as the machine disclosed in U.S. Pat. No. 1,790,397. This orifice chain is made up of a series of the apertured plates carried by an endless driven chain. The orifices 18 in chain 17 have their axial centers spaced the dimension "X" and the phase relationship is synchronized between the driven rolls 13, 14, forming spaced paddies 16, and the axes of spaced orifices 18 as will be described hereinafter under the heading "Drive System."

Orifices 18 may be varied in diameter for different production set ups, and, by way of example, in producing the novel container above referred to, the orifice will have a diameter on the order of 45 mm.

As the paddies 16 advance away from the feeder 12, they sag or slump downwardly through orifices 18 to initiate a downwardly depending hollow formation of glass. Orifice chain 17 then passes beneath the blow heads 19 on an endless chain-like carriage driven in phase synchronization with orifice chain 17. Center-to-center spacing of heads 19 on the blow head turret 21 (FIG. 1) is also "X" dimension. The heads 19 are manipulated to extend their blow tips 23 into the glass of paddy 16 while the other end of the head is connected to a wind box containing pressurized blowing air. The blow heads "puff" the glass to a parison P that is carried by the continuously moving ribbon of glass. The suspended parison P move between the open halves of a split mold 24 mounted on a blow mold turret 25 that is driven also in phase synchronism with orifice chain 17. Mechanism of mold turret 25 closes mold halves 24 enclosing parison P and mold 24 is rotated about its axis and the vertical axis of the parison. The molds are paste molds such as the conventional molds comprised of a porous cork-graphite-resin coating and treated with water each cycle so that the pore structure of the molding surface contains liquid water. Since blow head 19 is still in place on the glass parison, it reaches a point in movement with the orifice chain whereat air pressure changes from "puff" to "blow" characteristic; whereupon the glass is expanded from shape P to the shape of the mold. As the glass expands, water vaporizes by heat exchange and forms a steam cushion preventing dragging the mold surface against the expanding glass wall. This produces a seamless glass body B and thereafter mold halves 24 substantially simultaneously stop rotation and open away from the shaped glassware. The shape B at this point includes a shaped integral upper moile portion M of glass attached to ribbon 15. The ware next passes a stationary inspection device 17a which determines and rejects defective ware that is out of physical size specifications.

Further advancement of chain 17 carries the blown ware B into operative relationship with a pressurizer machine 26 (FIG. 1) mounted over the ribbon and having a series of heads 27 connected in endless chain-like fashion for movement around turret 26. The chain is driven so the heads have speed and phase synchronism with the orifices of chain 17. Each head 27 includes a pressurizer nozzle 28 advancing in aligned spaced relation with an orifice 18 along the underside of turret 26. The nozzle 28 lowers to the position illustrated (FIGS. 2 and 3) so that it may force air to flow from well in the moile portion or the neck of the ware upwardly through the top opening of the paddie 16.

With the air flowing upwardly of the moile, a crack-off device is operatve to sever the glass in the orifice and sever the ware B from the ribbon. The crack-off may be performed by any of several devices, one of which is illustrated on FIG. 2 as a disc plow 29 rotated on shaft 30 with the periphery of the disc lifting the ribbon 15 relative to the orifice chain, thus cracking the glassware at a point in the orifice from the ribbon. The remainder of the ribbon is lifted from the orifice conveyor and received in cullet chute 20.

Just prior to severing the ware B from ribbon 15, a transfer machine 31 (FIG. 1) has a conveyor guided in a rectilinear path past the crack-off device. The conveyor is equipped with heads 33 that include U-shaped tongs 34 extended on either side of the moile M prior to crack-off. Moile M has outwardly tapered wall. After the ware is severed from the ribbon, it will drop by gravity onto tongs 34 and be carried by conveyor 32.

In the movement with conveyor 32, the ware passes an inspection device 35 receiving energy in wave form from a transmitter 36. The character of the ware is sensed and may be rejected or discarded from tongs 34 if found defective. Rejection may be performed on the transfer device or at a later time, if desired. Subsequently, conveyor 32 spans a series of nozzles 37 in a spray applicator tunnel straddling the path of the transfer machine. This will apply a surface coating treatment onto the glass outer surface after forming and while the glass is in the range of 900° F.–350° F., depending upon the size of the container, etc.

The transfer machine path next overlaps the endless conveyor 38 of burn-off machine 39 (FIG. 1). Conveyor 38 includes a series of chucks 40 each having a seat 41 for supporting the bulbular or spherical bottom end of ware B and includes a series of three or more upstanding pivoted fingers 42 that pivot toward and away from the axis of ware B. The fingers 42 are articulated by means, hereinafter described, to open and close them about the central body portion of ware B. The ware B is carried upright by tongs 34 and lowered between the open fingers 42 in the overlapping paths of transfer conveyor 32 and burn-off conveyor 38. The articulated fingers 42 are next closed about ware B to seat it in chuck 40 and tongs 34 are laterally withdrawn away from the moile M of ware B. Conveyor 38 is running in speed and phase synchronism with conveyor 32 so that tongs 34 and chuck 40 are running vertically on center at the time of the transfer manipulation. Thereafter, the paths of these two conveyors diverge and ware B is carried off by burn-off conveyor through opposed banks of burners 182 and 183 to lessen the cooling rate of the necks of the ware. After the end turn of the burn-off machine, the ware is inverted by the movement of chucks 40 to the underside of burn-off machine 39. Chuck 40 is rotated about its central axis in the lower span of conveyor travel while carrying the inverted ware between elongated stationary opposed gas burner banks 43. In burners 43, heat is applied to the glass along an annular line or ring sufficiently to sever the moile portion M from the end of ware B and form a fire polished bead at the mouth opening of the ware (FIG. 2A). The moile drops below the burners and the ware is carried to an underlying ring-like holder 45 of the heat treating machine 44. The holders 45 are in the form of an annular ring or orifice in a carriage 46 that is pulled around a track on the machine 44 by an endless chain or belt 47. The holders 45 are mounted in the carriage for rotation about their centers thereby rotating the ware B in inverted attitude about its axis.

The path of the track is described about the end turns 48 and 49 on the machine 44 and the ware is transported past straight, elongated burner section 50 which heats an annular band about the rim portion R of ware B to a temperature above the strain point of the glass composition; for example, above 1200° F., in the initial span of travel of the ware while on holder 45. As will be described hereinafter for FIG. 6, the single, outwardly directed burner section 50 is preferred. Alternatively, the opposed burner sections 50 as shown on FIG. 2A may be utilized.

Referring again to the time when the ware is in the burn-off chuck 40, the path of the chucks 40 passes an inspection device 52 with its line of sight in the horizontal plane of the rim R of the ware (indicated by arrow on FIG. 2A, the inspection device being shown schematically by the box on FIG. 1). The device 52 performs an inspection of the character of the finish rim of the ware as it passes and ware found to have a defective finish R is released by its chuck 40 to drop the ware into a collecting chute 53 (FIG. 1). Ware that passes inspection is held by chuck 40 to travel in the path overlapping the path of the holders 45 on the heat treating machine. The holders 45 have the same center-to-center spacing as the chucks 40 and the carriage 46 is driven in speed and phase synchronism with burn-off conveyor by means hereinafter described. Therefore, as the inverted ware in chuck 40 is aligned over a holder 45 in the overlapping transfer area for the two machines, chucks 40 are operated to open their fingers 42 and drop ware B into the ring holder 45 for carriage in the same inverted position, but at a slightly lower level.

After ware B is carried past burner section 50, and is rotated for evenly heating rim R, as described, carriage 46 of the heat treating machine next conveys the ware through elongated, opposed cooling nozzles 54 in the cooling section 55.

As an alternative procedure (not shown on the drawings) hot glass surface treating may be preferably interjected between the span of the burner section 50 and the cooling nozzles 54. At this stage in the process, the necks of the inverted bottles after finishing in the burn-off machine are conveniently exposed and the surface of the glass is at proper temperature for applying a compound in the same general manner as accomplished on the transfer machine 31 by a surface treating device such as 37 (see FIG. 1).

Cooling air is supplied to nozzles 54 which emit a band of air onto the heated rim end of the ware while it is rotated in travel on the carriage. The glass finish, previously heated in the 1200°–1300° F. range, is relatively rapidly cooled to below 900° F. by air in cooling section 55. This supplies a heat treating effect to the glass at a band about one inch wide at the rim end of the ware. The glass surface has a compressive stress layer throughout the outside of the ware B and through a portion of the inner surface of the neck at this point.

In forming ware B on the ribbon machine in the paste mold, the glass of the wall structure was formed without seams, has relatively uniform thickness distribution, has a fire polish effect from forming in the paste mold and has little or no contact with surfaces of the apparatus until well after it is cooled below 1000° F. The first contact that the glass of the final container has with a surface of a mechanism is in the burn-off machine chucks, remembering heretofore that the container was carried on the ribbon by the moile, and transfer tongs 34 held it by the moile part. The ware has been handled so as to eliminate any opportunity for defects to arise in forming the glass by avoiding metal contact with the glass. Thus, the strength-to-weight ratio is at its highest up to burn-off. By this time, compressive stress is developed on the glass surface throughout the wall of the ware. As the ware is further handled by the processss equipment, the elements that touch the hot glass are metal parts coated with heat resistant materials, such as transite or the like, to avoid checking or abrading the hot glass. However, burn-off (thermal severing) of the moile and formation of the finish rim has thermally altered the stresses in the area of the wall near the newly formed rim. Accordingly, to restore this superior strength to the wall at and near rim R, the heat treating step is practiced as a tempering procedure to re-establish compressive stress in the glass effected by thermal severing (burn-off). The more precise detail of tempering—the heat treating procedure—is disclosed in a co-pending application of R. A. Fike, Ser. No. 15,523, filed, Mar. 2, 1970, now abandoned for continuation application Ser. No. 189,755, filed Oct. 15, 1971, and owned by the assignee of this application.

After the ware B is heat treated, the carriage includes a run that is overlapping with the path of a second transfer machine 56 having a conveyor 57 defining a rectilinear path. Conveyor 57 is made up of equally spaced vacuum chucks 58 that are downturned on the rod 59 and include a concave vacuum cup 60 which engages the bulbous bottom of ware B. The conveyor carries cups 60 at center-to-center spacing "X" and at a higher level than the holders 45 on the heat treating machine. In the overlapping paths of the conveyors 46 and 57, cup 60 of each vacuum chuck is lowered by cams on machine 56 to engage the bottom bulbular end of ware B. Vacuum is applied in cup 60 to attach the ware thereto and through rod 59 vacuum chuck 58 and ware B held thereby are raised to lift the ware out of holders 45. The conveyor 57 of the transfer machine 56 is run in speed and phase synchronization with chain conveyor 47 of the heat treat machine 44 in the manner hereinafter described under "Drive System." Thereafter, chucks 58 turn the corner and proceed along the next leg of the rectilinear path of transfer machine 56. In this path, the thickness and characteristics of the wall of ware B is inspected by an inspection device 61 (FIG. 1)—represented by the arrow at 61 on FIG. 2A flow diagram.

While moving in this second leg of the transfer path, ware B is carried through nozzles 62 on either side of this path and vacuum chucks 58 are rotated. Nozzles 62 emit a composition of a surface treatment in vapor or mist form and treat the exterior of the container with a second treatment. The glass wall of ware B is here at a temperature on the order of 300 to 400° F., preferably about 350° F. This treatment may take the form of the known polyethylene dispersion or a polyvinyl alcohol-polyvinyl acetate mixture used presently on container glassware as a polymer surface coating to protect the glass surface against abrasion. This enhances durability of the ware by providing further resistance to surface scratching of the glass during service of the ware.

Near the next turn of the corner by conveyor 57, any ware found defective in the inspection performed on it by device 61 will be rejected into a collecting chute (not shown) by reversing the vacuum in cup 60 to pressurized air. Upon turning the second corner on the transfer machine about sprockets 63, conveyor 57 proceeds along a parallel path with heat treating conveyor 46 but traveling in an opposite direction. The ware is carried inverted by cup 60 over the V-shaped, cup-like holders 64 on assembly machine 65. Holders 64 are connected in a chain conveyor 66 traveling around spaced end sprockets 67 and 68 of assembly machine 65 in an endless path described in a vertical plane. The top leg of the path of conveyor 66 overlaps the mentioned reverse leg of the transfer machine conveyor 57, and holders 64 are spaced along conveyor 66 at the same "X" dimension, center-to-center distance. Conveyor 66 is in speed and phase synchronism with conveyor 57 by the drive system, hereinafter described, so that the inverted ware B in cup 60 is centered over holder 64; whereupon, vacuum chucks 58 are lowered by the transfer machine to an elevation for releasing ware B into holder 64. Then the vacuum in cup 60 is released and ware B transferred for movement by holder 64, the latter being constructed to align the central axis of the ware vertically therein, as will be later described.

As the holder 64 advances along the top of assembly machine 65, the upturned bulbular end of the ware engages the leading edge of an inverted, open cup-like base fitment F positioned there by a line supply fed through base delivery conveyor 69. The base fitments F are manufactured, finished and delivered in a system hereinafter described under heading "Base Fitment System."

Figure 12:
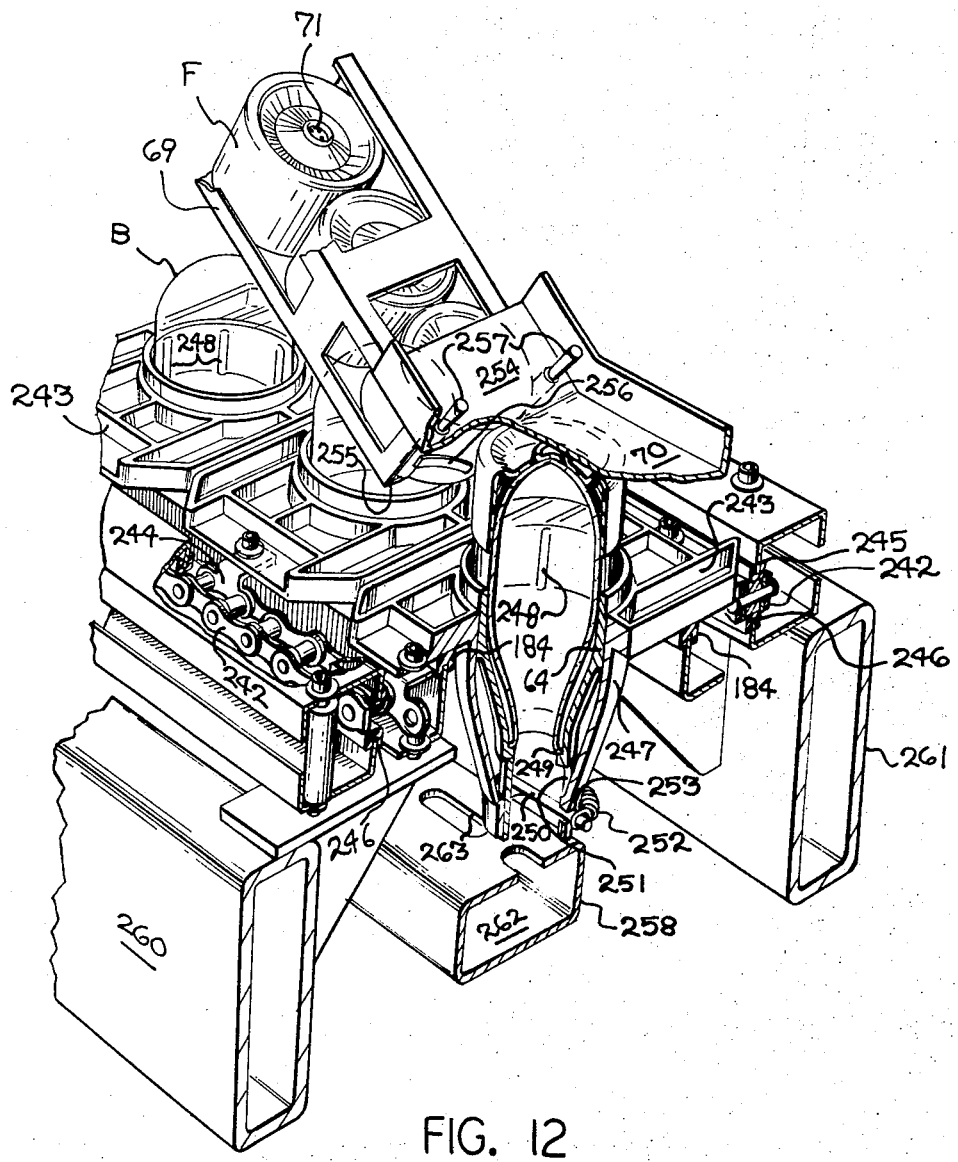
FIG. 12 is a perspective view, partly broken away, of the assembly station on the assembly machine whereat plastic base elements are assembled on the bottom end of the glassware.

As seen on FIG. 1 and more particularly on FIG. 12, forward movement of the ware and base fitment carries the latter under a cam plate 70 which presses the base telescopically onto ware B in an aligned assembled position. Air within fitment F is exhausted during the glass body displacement therein through bottom end vent holes 71 (FIG. 12). As conveyor 66 advances the ware and fitment further, the two components move under a base sealing device 72 comprised of heated irons 73—rod-like heaters—carried on an endless carriage 74 driven by mechanical drive connection (not shown) between an end shaft 75 of sealer device 72 and end shaft 68 of the assembly machine conveyor. This drive synchronizes the movement of heaters 73, spaced on carriage 74 at "X" center-to-center distance (the same as the ware spacing in holders 64 on assembly machine conveyor 66), with the movement of the vent hole area at the top facing surface of fitments F. Heater irons 73 then engage the plastic material in the vent hole area and heat seal the veats closed to form the asembled composite container of the form shown on FIG. 17.

Conveyor 66 proceeds around the far end turn at shaft 68. Holder 64 and the finished container therein are revolved to the upright position and at the underflight of conveyor 66, the finished container drops from holder 64 by gravity onto an underlying horizontal flight conveyor 77.

Figure 13:
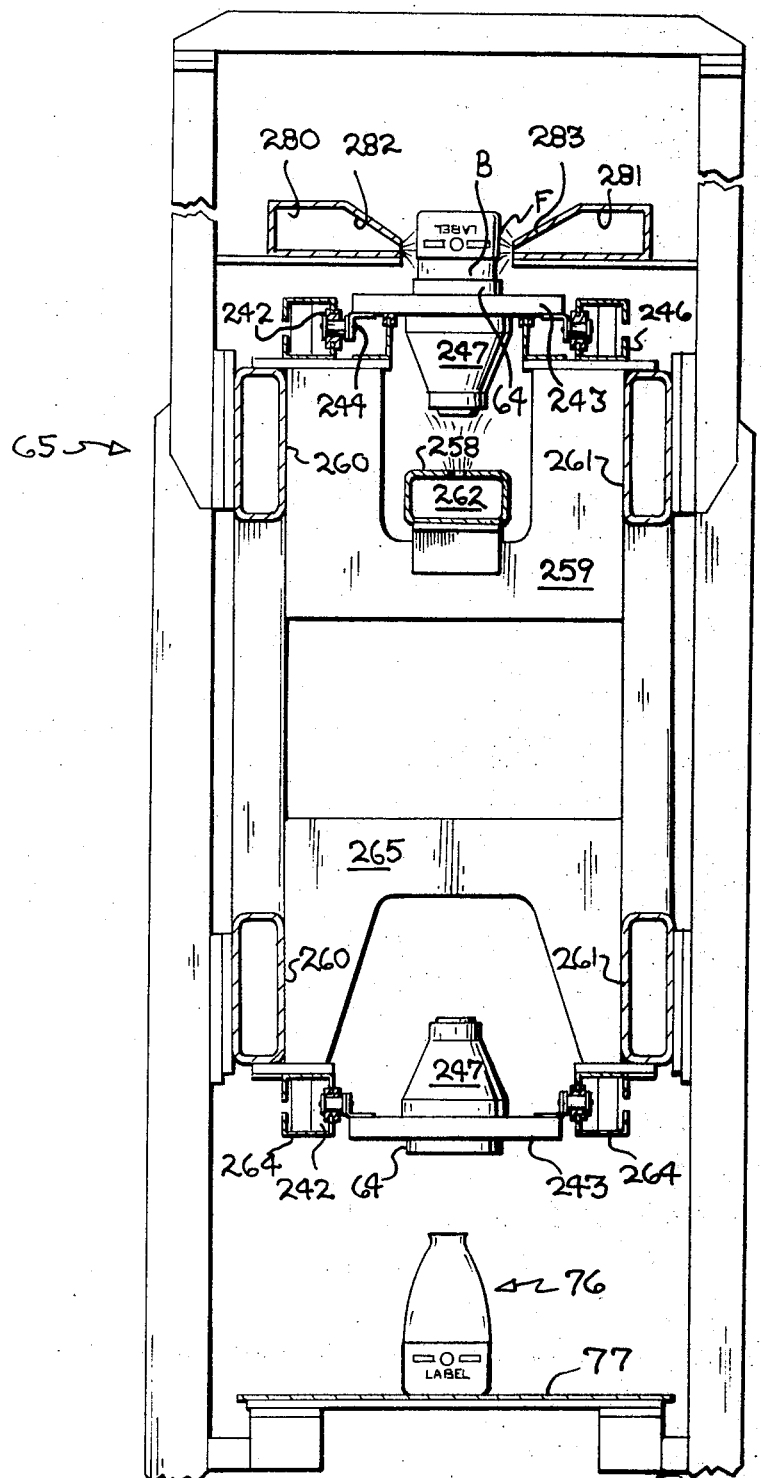
FIG. 13 is a transverse sectional elevational view of the assembly machine showing unloading the assembled containers from the manufacturing system.

In FIG. 13, along the underside travel of the conveyor the conveyor belt 77 is inclined gradually downwardly to enable stabilizing bottle on 77 before the transfer fully occurs whereat holders 64 are clear of the ware and it is supported solely by conveyor 77.

The finished containers 76 (see FIG. 17) are now handled in random fashion to and through a packing area and pallet loading device to form the stages 78, 79 and 80 of a pallet shipping load ready to warehouse the manufactured product or ship and deliver same to a customer.

BASE FITMENT SYSTEM

The base fitment F, described earlier herein, may take several forms. Generally, under the present invention, it is a cylindrical, walled structure applied to an end of the glassware in a telescopic relationship. Fitment F may be made of several materials less frangible than the glass of ware B, such as plastic, paper, paper-foil laminates, metal, woven or textile materials, fiberglas, etc. The description that follows discloses the manufacture of one form of base fitment disclosed in R. A. Heaton's aforementioned U.S. Pat. 3,482,724.

Figure 16:
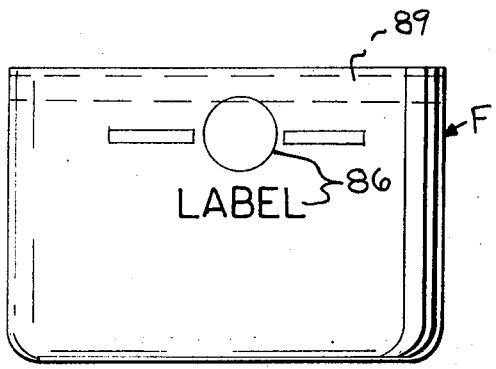
FIG. 16 is an elevational view of the cup-like plastic base component of the novel container.

Referring to FIGS. 2 and 2A, cup-like fitments of the shape shown on FIG. 16 are formed from polyethylene plastic in the multi-cavity injection molding machine 81. The produced plastic articles, indicated as blanks C, are from there conveyed through an oxidizing flame treatment device at 82 to prepare the wall surfaces, inside and outside, for the reception of certain polymer compositions applied in printing and for adhering the fitment to the glass ware later on in the production. The flame treated articles are then processed into an accumulator device at 83 conveying them into and loading them over the spindles 84 of a rotary offset printing machine 85. Printing machine 85 applies the multi-color decorative label and other printed information, indicated at 86 on FIG. 16, from an organic, polymer ink composition. After printing, the decorated fitments (indicated D on FIG. 2) are conveyed through a curing unit 87 wherein the printing is subjected to radiation for curing and bonding the decoration permanently on the fitment. From the curing unit, fitments D are conveyed to a turret type apparatus 88 which applies an extrusion of an adhesive composition onto the interior annular region of the wall of the fitment near its top free edge. This adhesive composition is preferably a hot melt adhesive that is extruded as a band or ring 89 of the material (shown on FIG. 16) to form the finished, predecorated base fitment F ready for assembly onto the glassware B. After the adhesive is applied, the finished fitments—now indicated as F—are inspected and conveyed into an accumulator unit 90.

The molding machine, illustrated as a single unit 81, will actually consist of several such machines feeding their product C into the after-processing line described to produce more than the quantity of fitments F demanded by production on the assembly machine 65 of the manufacturing line. The excess of filtment product is stored in the accumulator 90 so that temporary disruption of plastic part production will not effect a glassware shut-down or slow-down. Thus, the two systems need not be physically tied together, except by the supply conveyor 69 for feeding assembly machine 65. As base fitments F are withdrawn from the accumulator or otherwise fed into the delivery sytem, they are conveyed to the glass line assembly machine and en route oriented—as illustrated at 91—into inverted position such that the adhesive band is at the downwardly facing end of the fitment and the decoration label is upside down. In this inverted position, the base fitments F are eventually supplied in compact single line supply along base conveyor 69 to merge the fitments one by one onto the succession of glassware B.

Having described the manufacturing system of the invention to produce articles such as the novel composite container of the Heaton patents, above-identified, certain of the machines for performing the process will be hereinafter described.

GLASSWARE FORMING MACHINE AND PRESSURIZER COMBINATION

As earlier described herein, a horizontally traveling orifice plate chain 17 advances a glass ribbon 15 past blow head turret 21 moving in a vertical path and glass is formed as parisons through the orifices 18. The molds 24 enclose the parisons and ware is blow molded by coaction between the blow head, orifice plate and blow molds. After the mold 24 and blow head 19 separate from the glass, the shaped ware is suspended from the ribbon and the ribbon is anchored onto the orifice plate chain 17. Chain 17 moving progressively forward carries this ware with its mouth opening upwardly under the pressurizer apparatus 26. The apparatus 26 includes spaced apart end turn shafts 92 and 93 turning the guiding and driving sprockets for establishing generally the endless vertical path of travel of the spaced pressurizer nozzles carried thereon.

The specific disclosure of the pressurizer machine 26 is contained in a copending application of co-inventor R. A. Heaton, Ser. No. 245 filed Jan. 2, 1970, now U.S. Pat. No. 3,642,461 and owned by the assignee of this application. The structure of pressurizer head 27 is herein shown somewhat in detail on FIG. 3, which includes a holder 94, coupling pins 95 and end rollers 96 running in guide tracks 97 of the machine 26. An upper cylinder assembly 98 is connected to depend telescopically from holder 94 and is urged upwardly by an internal spring (not shown) compressed between holder 94 and upper cylinder 98. Cylinder 98 carries shoe 99 having a central vertical passageway therethrough connected with a central air passage through cylinder 98. Shoe 99 is in a normally extended position to engage the bottom plate 100 of wind box 190. Along the length of wind box 190 there is a slot opening 191 connecting the supply of compressed air connected into wind box 190 with the central passageway of shoe 99.

Holder 94 has a lower cylinder 192 telescopically slidable axially in the holder. At the lower end of cylinder 192 are an opposed pair of arms 193 carrying rollers 194 rotatable on shafts 195. Rollers 194 run on horizontal, parallel cams 196 which guide the rise or fall of rollers 194 as they roll over the cam. The pressurizer nozzle 28 is attached to the lower end of cylinder 192 and comprises a downwardly projecting pipe and outwardly flared nozzle tip. Nozzle 28 has a central air passage 28a into the tip into which inclined apertures 28b are connected. The lower end of the tip is closed and accordingly air supplied from box 190 along the passage of the head by 28a is emitted from the nozzle at the outer extremity of apertures 28b, the latter being inclined outwardly and upwardly from the horizontal. Nozzle 28 is manipulated into and out of the mouth opening of glassware B by the contour of cam tracks 196 along the span of carriage for heads 27 at the underside of pressurizer apparatus 26.

The nozzles 28 are successively introduced into the interior moile region of ware B at the initial stages of this underside span of travel of heads on the pressurizer machine. Air is emitted to flow from within the moile below the crack-off line 197 approximately adjacent the bottom edge of orifice 18. As the air is flowing out of the mouth of the ware, crack-off of the ware along line 197 is effected by the severing means 29, 30, shown somewhat schematically on FIG. 4.

After crack-off of the ware from ribbon 15, nozzle 28 is lifted by cam 196 action on rollers 194 to a raised and latched position. As the latch 198 on cylinder 192 is raised to the top position, it moves past a ratchet ledge 199 of the latch lever assembly 200. Assembly 200 includes a bell crank 201 pivoted at pin 202 in a lower part 94a of holder 94. Bell crank 201 is spring loaded (not shown) normally pivoting latch ratchet ledge 199 toward the axis of holder 94. Latch 198 will pass ledge 199 on the rise until it is above it; whereupon the spring loaded ratchet ledge is spring pivoted under the latch 198 holding the nozzle in a raised, latched position. As the nozzle is to be lowered, roller 203 on bell crank 201 engages a trip cam (not shown) pivoting ratchet ledge 199 outwardly away from the holder thereby disengaging the latch 198.

TRANSFER MACHINE

Referring to FIGS. 1, 3 and 4 transfer machine 31 is driven by sprockets engaging its conveyor chain (as disclosed in the below referenced Banyas application) and has spaced sprockets thereon driving the conveyor 32 in the rectilinear path about the machine. Conveyor 32 has a series of transfer devices as U-shaped tongs 34 (FIGS. 3 and 4). The structure of the machine for manipulation of tongs 34 in receiving and transferring ware severed from the ribbon, as above described to the burn-off machine conveyor, is disclosed in copending application of John D. Banyas, Ser. No. 825,850, filed May 19, 1969 (now U.S. Pat. 3,590,982), owned by the assignee of this application.

As seen on FIG. 3, tongs 34 are mounted on a slide 205 shiftably connected to the transfer conveyor chain 32. The transfer device also includes a scissors-type mechanism consisting of arms 206 (one shown) pivotally connected on transfer chain 32. Push rod 207 is pin connected at 208 to an arm 206 for revolving arms 206 open and closed about ware B at a lower neck region. As the ware is carried by tongs 34 about the corners of the conveyor path, the arms 206 are closed (position shown at left hand drawing, FIG. 5) to prevent the ware swinging excessively at the corners to retain ware on the transfer conveyor.

Referring to FIG. 1, the ware in its transfer is carried through a surface treatment device 37 whereat a metallic oxide composition, in vapor form or vehicle, is applied to the outer surface of ware B as it is carried therethrough. The structural details for this treatment is disclosed in a copending application of S. M. McLary, Ser. No. 851,649 (now U.S. Pat. 3,615,327), filed Aug. 20, 1969, and owned by the assignee of this application.

While on the transfer machine 31, ware is also inspected for certain forming imperfections by a device 35 (FIG. 1). The point of this inspection may occur in the travel of ware between the time tongs 34 receive it from the ribbon machine at crack-off and turning the second corner of the path at guide sprocket 209. The ware after inspection, if found defective, is rejected by a means, such as shown and described in a copending application of Luther H. Wideman, Ser. No. 11,394, filed Feb. 16, 1970 (now U.S. Pat. 3,606,013), and owned by the assignee of this application.

Burn-off conveyor 38 includes a series of horizontal plates 210 (FIG. 5) hingedly connected to each other in an endless chain, each plate 210 having the cup-shaped seat 41 on an upstanding pedestal 211 upon which the lower end of ware B rests, and three or more upwardly projecting, clamping fingers connected at pin 212 to the plate. Fingers 42 are actuated by movable dogs 213 in cam slots 214 angled upwardly and inwardly from the lower ends of fingers 42. In retracting dogs 213, fingers 42 are pivoted to an open position (3rd sequence on FIG. 5) which permits the ware to be lowered, with clearance, between fingers 42 into seated supporting engagement upon seat 41. Extending dogs 213 in cam slots 214 close fingers 42 to clamped position and rollers thereon engage the glass to grip and support the ware from symmetrically spaced positions around its body periphery.

As the ware B is conveyed by transfer machine 31 above the upper run of burn-off conveyor 38 (FIG. 5), the transfer machine lowers the ware through the open, clamping fingers 42 onto the cup-shaped seat 41 of the burn-off chucks 40 conveyed on the burn-off machine in synchronism with the transfer machine. The clamping fingers 42 are then closed, and the supporting tongs 34 on the transfer machine disengaged from the ware. It is now clamped in upright position on the conveyor 38.

BURN-OFF MACHINE

Conveyor 38 then conveys the ware to the burn-off device 43 which severs moile M from the body of the ware. As seen on FIG. 1, the travel of the ware on the upper side of the machine after transfer to the chuck 40 may be utilized for some preheating of the moile region. This is accomplished by the opposed burner banks 182 and 183 applying an elongated cross-flame through which the upper neck and moile of the ware travels when upright at the top side of the machine. The ware next turns the end of the machine and becomes inverted, neck down; whereupon the moile is promptly introduced between the opposed burners 43 and the burn-off operation is consummated.

Figure 6:
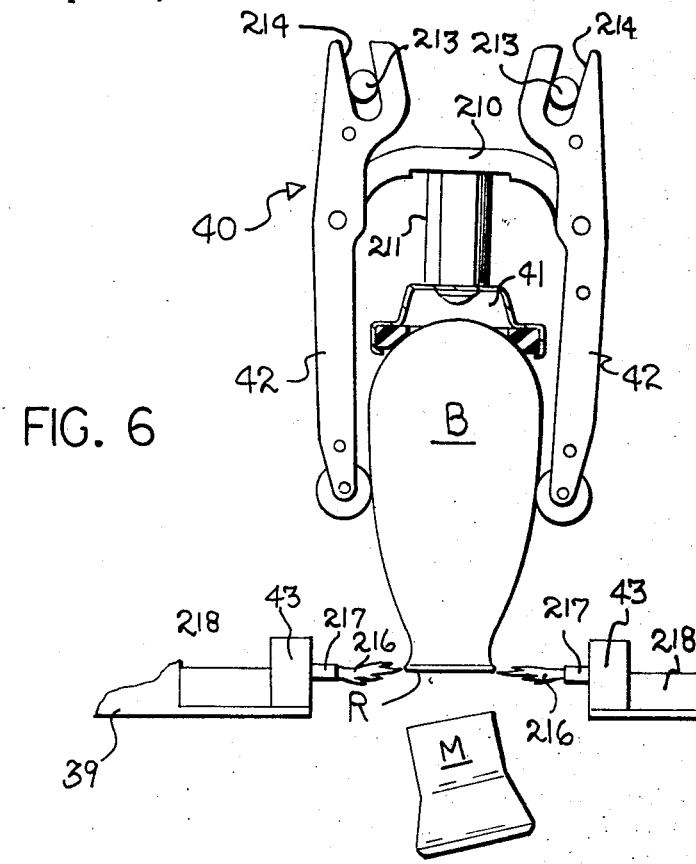
FIG. 6 is a partial front elevational view, partly in section, of the chuck of the burn-off machine in position opposite the burner thereof showing the severing of the moile end portion of the glassware.

This burn-off operation is illustrated on FIG. 6. During travel of conveyor 38 at the underside of machine 39 (FIG. 1), the ware is held in the gripping chuck 40 by spaced fingers 42. The form of seat 41 is such that the axis of ware B is vertical in the chuck and the chuck 40 is rotated about the axis of the ware by means (not shown) along the path of conveyor 38 thereat. Along a span at the underside of machine 39 are mounted two sets of burners 43 which issue a laterally directed gas fired flame 216 from longitudinally, closely spaced series of jets 217. Each burner bank 43 is held by a bracket 218 on the burn-off machine 39 at the elevation desired for severing moile M from ware B. By imparting an axial rotation to chuck 40, the longitudinally spaced series of flames 216, spaced to be adjacent or overlapping on opposite sides of the neck of ware B, heat the glass along a narrow annular band. The glass in this band is heated relatively rapidly above the softening point temperature and moile M is burned off or severed leaving a rim edge of softened glass. Further application of the flame is employed for reshaping the rim edge at the burn-off line by the flame 216 being progressively diminished so that glass flows to the form of a bead and hardens to form the rim finish R of the container upon cooling.

After burn-off of the moile, the ware is carried past the inspection device 52 to determine whether the moile was severed and a rim finish R formed and the general character of that finish rim. Based upon requirements of the inspection standard and what was determined in the inspection, ware that is found defective is rejected into the chute 53 (FIG. 1) by means on the machine actuating dogs 213 of the proper chuck 40 to open fingers 42. Inasmuch as the ware is suspended by the grip of fingers 42, their opening will reject ware from chuck 40 by gravity.

The good ware is retained in chuck 40 and advanced to the far reaches at the underside path of conveyor 38, whereat dogs 213 of chuck 40 are actuated to open fingers 42 and drop the ware into the underlying holder 45 of the heat treating machine then in underlying, overlapping relation with the path of the burn-off conveyor.

HEAT TREATING MACHINE

Figure 7:
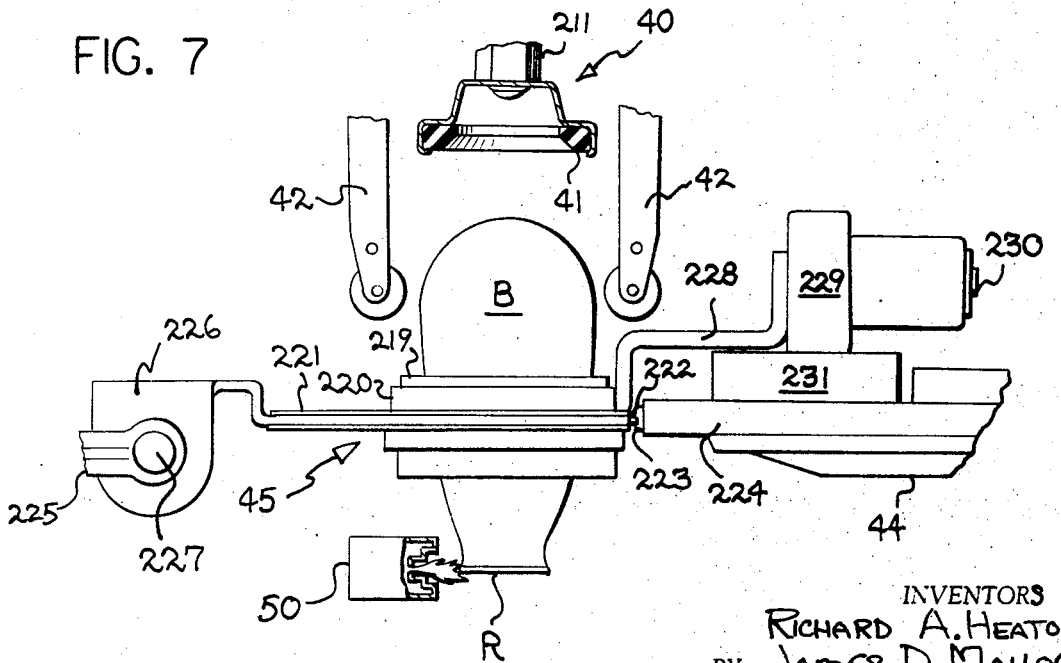
FIG. 7 is a partial front sectional elevational view of the burn-off machine chuck transferring glassware to the annulus holders of the heat treating machine conveyor.

As seen on FIGS. 7 and 8, the heat treating machine 44 has a holder 45 for supporting ware in inverted position. The holder has an interior orifice formed by an annulus or ring 219 supporting the ware at spaced raised points therein. Ring 219 is rotatable in a bearing 220 fastened in vertically spaced horizontal plates 221, and ring 219 has an external ring gear 222 that meshes with stationary teeth 223 or equivalent on a longitudinal mounting member 224 on the frame of a heat treating machine 44. The holder 45 fastens to conveyor 47 of the machine by the arm 225, and pivot boss 226 on plate 221 of the holder and pivot pin 227 therethrough. At the opposite edge of plates 221 an upturned, L-shaped bracket 228 is rigidly connected and has a carriage roller 229 pivotally connected to it by lateral shaft 230. Roller 229 runs on the horizontal guide track 231 paralleling the endless path of conveyor 47 around the heat treating machine.

As seen on FIG. 1, the conveyor 47 moves the ware in its holder 45 past the elongated burner section 50 which emits a lateral flame as an elongated ribbon of fire along the side of finish rim R so that the rim end of the ware is immersed in flame and heated above the strain point of the glass (above 1100° F.). A single burner section 50 as illustrated on FIG. 7 is the preferred construction, and this burner section is mounted on the frame of the heat treat machine so the flame is directed outwardly away from the machine (toward the right on FIG. 7). After leaving burner section 50, the holder apparatus shown on FIG. 7 moves through a short surface treating section and then between opposed, elongated banks of coolers 55 (FIG. 8) that apply quench cooling air (indicated by lateral, opposing arrows) to this same rim end of the glass and cool it to instill proper temper in the glass in that region. In the heating section 51 and first cooling section 55, the velocity of the flame impingement and cooling air may require a hold down on the top of the bottle in the holders. This may be provided in any convenient manner, such as an attachment to the holder, or a traveling overhead belt carrying hold down members on each container. The cooling means 55 is constructed similarly to the burner 50, except the openings 232 of the cooler structure facting the glass is suitable for applying the coolant as a band spray of air and in proper volume to accomplish the amount of cooling effect needed for tempering in the time the ware travels with carrier assembly 47, 45 around the far end of the machine and approaches the overlap with second transfer machine conveyor 57 (FIG. 1). In this span of travel, the heated neck end of the ware should be cooled below 900° F. In so doing, substantial compressive stress is achieved on the outside surface of the ware and particularly for the neck and finish of the container.

SECOND TRANSFER MACHINE

After heat treating the ware, it is removed from machine 44 by the machine 56 and subsequently surface treated and/or inspected (see 61 and 62) and transferred to assembly machine 65 (FIG. 1). At the interface between the respective conveyors 47 and 57 of the first two mentioned machines, the ware is transferred, in succession, as illustrated on FIG. 9.

Conveyor 57 of the second transfer machine is made up of a series of vacuum chuck assemblies 58 which are linked together into an endless chain for movement along a generally rectangular endless path. Each chuck assembly 58 includes a vertical, tubular shaft 233 which defines a central passageway 234 and is fitted with an end valve stem 239 and valve passage 240 into chamber 235 to provide fluid communication through the shaft to the chuck. A complete description of the machine 56, its valve 239, controls and vacuum chucks (58 herein) is set forth in the copending application of John D. Banyas and Frederick L. Wallington, Ser. No. 24,173, filed Mar. 31, 1970 (now U.S. Patent 3,637,074), and owned by the assignee of this application. The passageway 234 is open to the interior space 235 defined within the outwardly flared, downturned wall 236 of chuck 58. At the lower periphery of wall 236 is an annular outwardly sloping seal 238 of rubber, or like sealing composition, for sealing engagement on the bulbular end surface of ware B. The inner diameter of seal 238 is less than the diameter of the outwardly sloped seat 237. The tubular shaft 233 is connected to means on the conveyor of the machine operated in response to travel in the endless path thereon for lowering the chuck 58 to the point where the annular seat 237 engages the end wall of the ware and annular diaphrgm seal 238 tightly engages the end wall to seal chember 235 from the atmosphere. With the ware thus seated, the end wall of the ware engages the lower end of valve stem 239 lifting the latter thereby connecting passage 234 with valve passage 240. Suitable controls on the machine (not shown) connect a source of vacuum or a source of air under pressure into passage 234. As each chuck 58 is lowered onto ware on the underlying holder 45, passage 234 is connected to vacuum. By engaging ware B in the seat 237 and seal 238, lifting the valve stem 239 connects the vacuum to passage 240 at the undercut valve slots 241 and applies vacuum into the chamber 235 sealed by the ware at seal 238. Vacuum in chamber 235 thus attaches the ware onto the chuck 58 and it is next raised by lifting rod 233 on the conveyor to transfer the ware out of holder 45.

Means are provided on the machine 56 to rotate the rod 233 on conveyor 57 by a sprocket on rod 233 engaging a chain or teeth (not shown) on the machine. As the chuck 58 and its held ware B move past the opposed vertical banks of spray nozzles 62 (FIG. 10), a polymer composition is sprayed onto the side wall of the ware held by the chuck. Inspection is also performed as the ware moves past device 61 (FIG. 1) and defective ware is ejected from chucks in the manner described in the aforementioned application of Banyas and Wallington.

The ware that is not rejected is next carried by chuck 58 into overlying relationship with holders 64 on the assembly machine in their overlapping interface span of the respective conveyors 57, 66. This relationship is shown on FIG. 11.

ASSEMBLY MACHINE

The ware suspended in chuck 58 is lowered so that it is partially inserted into the holder 64 of the assembly machine conveyor 66. The vacuum supplied to passage 234 of chuck 58 is then disconnected and the passage connected to atmosphere or positive air pressure. This transfers the ware to the lowered position shown on FIG. 11 and allows valve stem 239 to drop into its seat at the lower end of passage 234 disconnecting the passage 234 from chamber 235. When ware is again inserted up into chuck 58 so as to physically engage the valve stem 239 and raise it, vacuum will be connected into the chamber 235.

The assembly machine conveyor 66 includes a pair of transversely spaced roller chains 242, between which are supported and carried a series of ware holder frames 243. Chains 242 are connected to each frame 243 by mounting brackets 244 and supported and guided upon the machine to travel about end-turn sprockets 67, 68 in a clockwise direction, FIG. 1. On the upper reaches of chain 242, they are supported and guided for longitudinal travel by guide rails 245 and 246 (FIG. 12), respectively engaging the top and bottom surfaces of chain 242 to establish an accurately defined path of travel for ware holder 64, particularly along the upper run of conveyor 66, for reasons hereinafter mentioned. The holder frames 243 are further supported in the active upper reach of the assembly conveyor by underlying, laterally spaced apart, padded, horizontal rails 184. These rails 184 not only provide an accurate horizontal flight of the conveyor but give back-up support to the plates 243 while the base fitments are being applied.

Holder frame 243 is a generally flat, rectangular plate-like element having an integrally connected central sleeve 247. Sleeve 247 has a large diameter opening at its upper end and tapers inwardly on an relatively small diameter at its lower end. Holder 64 is complementary in shape to sleeve 247 and slidably received into the latter. Both sleeve 247 and holder 64 are open at both ends. The internal wall of holder 64 has spaced ribs 248 that provide an internal diametrical dimension between them that is but slightly greater than the external diameter of the ware. A small diameter ledge 249 is formed near the lower interior end of holder 64 for annularly engaging the rim R of the ware. Holder 64 is capable of axial sliding movement within sleeve 247, as shown on FIGS. 11 and 12. Holder 64 is releasably latched or maintained in the elevated position by a detent assembly which includes pin 250 slidable relative to holder 64 along diametrically disposed, vertical slots 251. If sufficient force is applied to holder 64, it may slide vertically downwardly in sleeve 257 by camming pin 250 from its detent 253 along the slot 251. A spring 252 applies a biasing force to hold pin 250 in its detent slot. This detent device prevents jamming of ware if it is too high in the holder at the point where base fitments are assembled.

Figure 11:
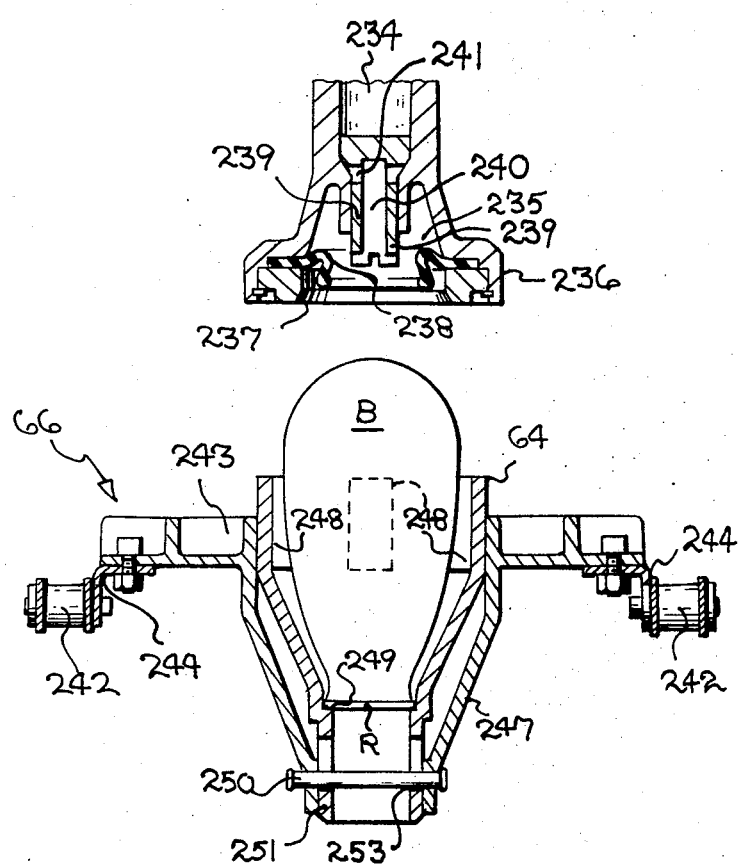
FIG. 11 is a sectional elevational view of glassware transferred by the vacuum chuck into the cup-like holder of the assembly machine conveyor.

The ware B is loaded into the holders, as shown on FIG. 11, and over-height containers are adjusted by a fixed elevation cam on the machine that irons or depresses holder 64 sufficiently to prevent jams in the base fitment feed.

Inverted base fitments F are fed in line along the downward gravity feed leg at the terminus of base delivery conveyor 69 and into the discharge gate formed with the sloping overhead plate 254 thereat. The fitments are permitted to overlap the leading lower edge 255 of the chute and be exposed to engagement with the forward side of the advancing ware. The spring-like gates 256 at opposite sides of the delivery chute arrest the forward gravity feed advance of the line of fitments, and provide a demand feed for the fitments by the ware passing beneath. The spring gates are rotatably mounted on the generally vertical rocker pins 257 journal mounted on the opposite side frames of the chute. Ware B engages the forward fitment in the chute and pulls it through the escapement provided by the rotatable gates 256. After that fitment passes, the gates pivot closed by the spring biased loading (not shown) on the rocker pins 257. The captured base fitment, once its trailing edge clears the chute, drops onto the ware bottom end. Forward movement thereafter irons or cams the fitment onto the glassware by the cam plate 70.

The assembly machine was designed for a continuous assembly line system through which the glass container moves continuously from its formation to final palletizing of completed composite containers for shipment. At the time the container ware B reaches the assembly machine, it is still at a temperature in excess of 200° F. The base fitment F is provided with the band 89 of hot melt adhesive (FIG. 16) having properties such that the adhesive is activated by heat and the residual heat of the container in the present invention activates the adhesive when the base fitment is placed on the ware. This adhesive will set to form a permanent bond between the plastic base and glassware after some cooling.

In assembly the presence of vents 71 in base fitments F is necessary to exhaust the air displaced inside the fitment when the bulb end of the ware is inserted. On the other hand, once the container is assembled—the two parts united—the presence of vents 71 in the completed composite container is undesirable. The problems presented by the vents 71 arise in the bottling plant where beverage being bottled may inevitably find its way into the interior of the base through vent openings 71. In the case of fermented beverages, such as beer, the conditions inside the assembled base element are conducive to the formation of molds, while with other beverages, unpleasant odors, inopportune leakage or stickiness can occur. Therefore, the assembly machine is preferably provided with a vent sealing apparatus 72 for heat sealing vents 71 in the plastic base fitments. The apparatus 72 comprises a chain 74 carrying the heaters 73 spaced longitudinally on centers the same as ware in the assembly chucks 64, and the chain is driven mechanically off of the assembly machine drive. The heaters are driven to engage the plastic around the vents 71 and the heat supplied will cause the plastic to soften and flow so as to heat seal the vents.

Referring to FIGS. 1 and 13, the lateral section of assembly machine 65 shown on FIG. 13 is taken forward of the base delivery point of conveyor 69. The frame of the machine includes a hollow duct 258 supported by a series of spaced webs 259 attached securely (welded) to the side channels 260 and 261 of the frame. Duct 258 runs longitudinally of the after three-quarters of the machine and has spaced top orifices 263 or outlets (FIG. 12) for cooling air flow. Forced chilled air is supplied to the passageway 262 of the duct 258 and flows through these upper outlets onto the assembled composite containers after base and glass components are united under the cam 70 (FIG. 12). Side cooling air is directed onto the container and fitment by the bracket mounted longitudinal ducts 280 and 281 each having elongated lateral nozzles 282 and 283, respectively.

Figure 17:
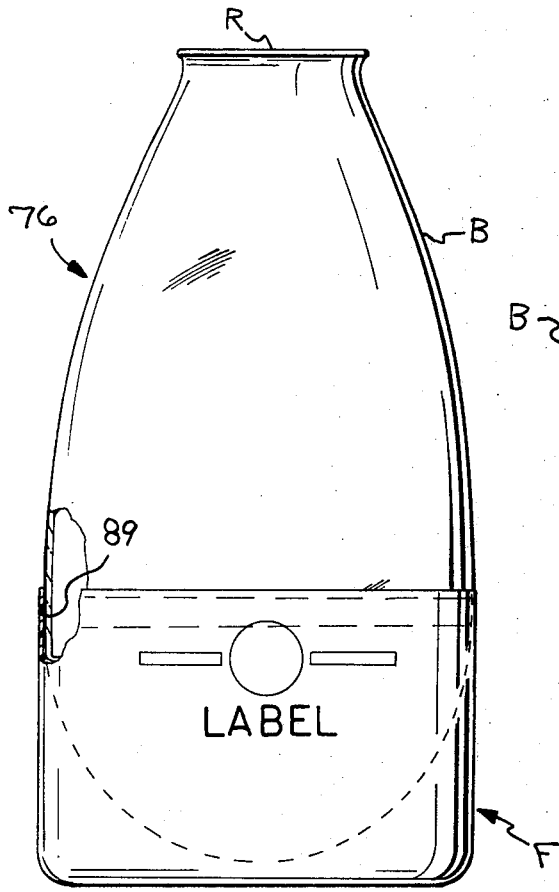
FIG. 17 is an elevational view, partly broken away, of the assembled novel container.
Figure 15:
FIG. 15 is an elevational view of the glass component of the novel container.

This chilling air cools the composite assembly and sets the hot melt adhesive effectively to complete the assembly of the container 76 in the form shown on FIG. 17. The structure of assembly machine is fully set forth in the copending application of James D. Mallory, co-inventor herein, Ser. No. 883,515, filed Dec. 9, 1969.

After passing the base sealing device (FIG. 1), assembly conveyor 66 passes around the end turn 68. Through the end turn 68, containers 76 are kept in their holders 64 by the arcuate guide plate 264 until the containers are again in substantially upright position with their axes perpendicular to the underlying conveyor belt 77 traveling with the underside of conveyor 66; whereupon gravity drops the containers 76 out of their holder pocket and they travel with this conveyor 77. At this point the container article is released for the first time in the entire process from the positive control at the "X" dimension center-to-center spacing maintained on the handling conveyors since the glass was formed in the ribbon into the paddies by the rolls 13, 14 of the ribbon forming machine.

On the lower side of the assembly machine (FIG. 13) the side chains 242 are guided by channels 264 connected to the underside frame members 260, 261. Structural cross webs 265 attach laterally of the machine frame between members 260 and 261 to complete the rigid assembly for carriage movement about the assembly machine 65.

DRIVE SYSTEM

Figure 14:
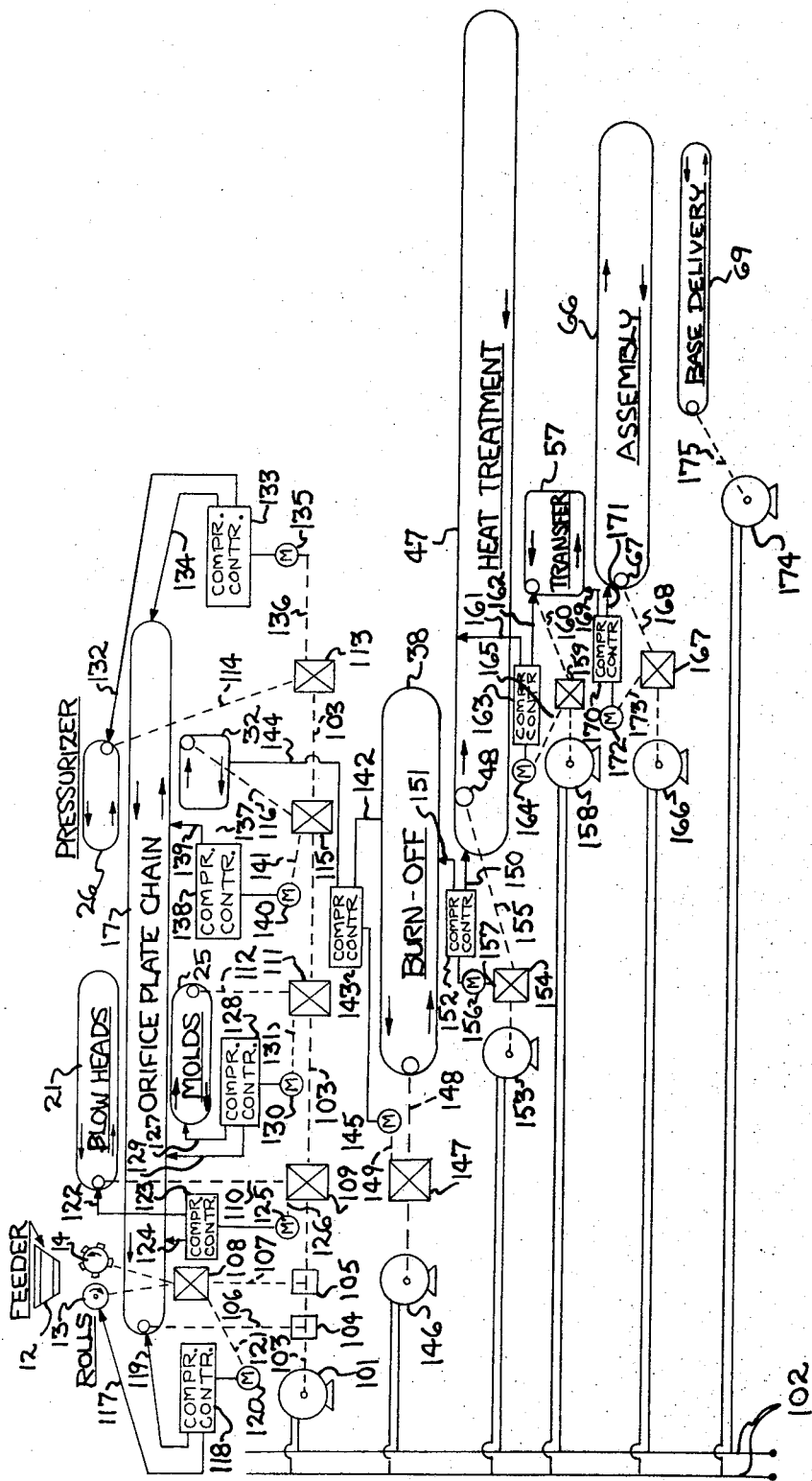
FIG. 14 is a diagrammatic view of the power system operating the manufacturing line machines as a synchronized unit.

As shown diagrammatically on FIG. 14, the various machine units described herein are connected to a drive system that operates the various units in synchronism; i.e. speed synchronism and position synchronism. The drive system connects these various machines as an integral system for the continuous production of articles, such as the form thereof shown on FIG. 17.

The manufacturing process of this invention is continuous and designed to operate at production rate up to 1000 articles per minute. The flow of product, indicated earlier, is from the glass furnace to the ribbon machine, through the first transfer machine to the burn-off, from the burn-off machine to the heat treatment machine, from the heat treatment machine through the second transfer machine and from the second transfer machine to the assembly machine. Upon release from the assembly machine, the final product is carried away in random array for use or storage. Up to that time, the product is tied together in a continuous chain from the time the glass materials fuse to a molten glass in the furnace until the bases are assembled and seated at the conclusion of the production steps in making a multiple part article, such as the two-piece container.

By this invention, a continuous strip process involves a flow of glass from a molten parent body through forming rolls as a continuous ribbon that is laid on the orifice plate chain of the ribbon machine. In the ribbon machine, the glass is blown into molds, shaped and then transferred as a succession of articles separated from the ribbon machine by the transfer machine placing them into the burn-off machine. In the burn-off machine, the waste glass (moile) above the lip or finish to be formed is burned-off (severed) and discarded. After the lip has been formed on the container, the containers are passed into the heat treat machine where stresses are relieved from the glass wall near the formed lip. The containers then flow in succession into a second transfer machine whereat they are inspected and surface treatment applied to the walls of the container, if needed. The containers next go through the assembly machine where a plastic base component is affixed to each from a line of bases fed to this machine. Thereafter, the containers are released from the product flow and taken to a storage or shipping area by suitable take-away conveyance (not shown).

Each machine employed by the described process is a continuous chain-like structure. A single container passes in a continuous flow from one machine or step to the next at substantially constant velocity. Each container is handled automatically from one machine and step to the next. The containers are carried by heads or chucks (see FIG. 1) and are transferred from one head on one machine to a head on the next machine at a transfer point (inter face) between the two machines. The containers are carried by these heads at like center-to-center spacings (dimension "X").

In the drive of the various chain structures of the machines, position synchronization between adjacent machine heads and their chains is achieved, as will be presently described. Position sensing is used in the system to sense the true linear position at the point of transfer of containers from one machine head to an adjacent machine head. The center-to-center distance between containers is pre-established, say four inches apart. This is built into the heads on the chains of the various units of the line. Every space along the chain of each machine— as in our example, every 4 inches, corresponding to the center line (axis) position of each container—is mounted a small, round metallic pin or "flag" 176 that moves with the chain. As a part of a comparator control circuit (indicated on FIG. 14 by the legend "COMPR. CONTR."), a sensor is mounted in fixed position adjacent the path the flags take with the machine. The sensor is responsive to the dead center registration of it and the adjacent flag to produce a pulse in the comparator control circuit. By having a sensor on two adjacent machines, for example, the heat treat machine chain 47 and the second transfer machine conveyor 57 (see FIGS. 18–20), two signals are generated and fed into the circuits corresponding to the time-space positions of the respective flags and their corresponding sensors.

Figure 19:
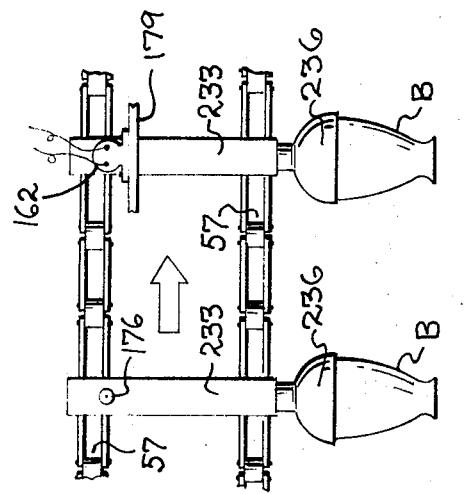
FIG. 19 is a side elevational view of the vacuum chuck conveyor of the second transfer machine, sensor flags thereon, and sensor for the comparator controller.
Figure 20:
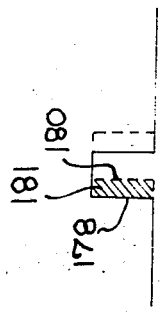
FIG. 20 is a simplified electrical wave form diagram illustrating the sensed out-of-phase relationship of two conveyors in the system of FIG. 14.
Figure 18:
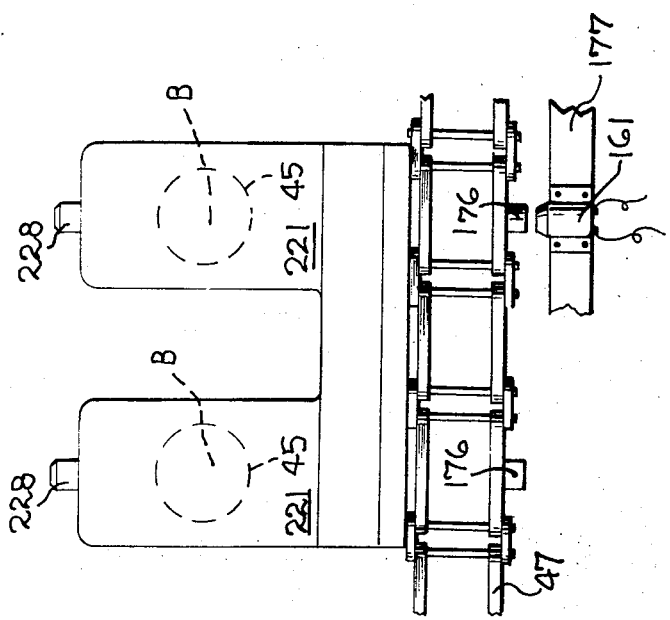
FIG. 18 is a plan view of the heat treating conveyor, sensor flags thereon and a sensor for a step motor comparator controler.

Referring to FIGS. 18 and 19, conveyor chain 47 of the heat treat machine carries flags 176 spaced therealong the same distance as the center-to-center distance between the annulus provided by consecutive holders 45 carrying the glassware. The sensor 161 is mounted in stationary position on a frame member 177 of the heat treat machine along the path of chain 47, the end of the sensor being spaced about ¼ inch from the axial end of the flags. As flag 176 aligns on the center of sensor 161, the later produces a pulse similar to the chopped wave form 178 (solid outline, FIG. 20). The second transfer machine 56 has a sensor 162 mounted on a member 179 on the machine frame. Each tubular shaft 233 of the vacuum chucks 58 on conveyor 57 includes a metallic flag 176 which will travel past the sensor in similar close proximity. The shafts 233 and flags 176 there are similarly equally spaced apart on the conveyor the same "X" dimension, center-to-center of the lower cups 236 carrying the ware. Flag 176 when centered on sensor 162 produces a pulse shown on FIG. 20 in dotted line as chopped wave form 180. If we assume the timed generation of pulses 178 and 180 occur at different times, the differential, shown as cross-hatched area 181, represents the amount the chucks on conveyor 57 are out of phase with holders 45 that are to deliver to the former the ware to be transferred from one conveyor to the other. The two pulses from sensors 161 and 162 are connected to the circuitry of the comparator controller 163, and the signals now in the circuitry are integrated to develop a pulse proportional with the area 181 (FIG. 20) whose width or interval is modulated and corresponds with any error of registration or synchronization of containers or their heads (chucks) of the two machines. The pulse actuates "sample and hold" circuitry in the control which develops an analog output signal proportional to the error of synchronization sensed. This error signal is then used in voltage level sensitive circuitry to develop closures (synchronization correction) for position control of the drive and the chains affected thereby. The other sensor-comparator controllers herein referred to operate by the same principle as the example given. The difference in numbers in the following description of the various sensors and controllers, etc. are for identification of location and function in the system rather than distinguish the kind of component.

Before describing the entire automatic synchronizing drive system in more detail, a typical operation sequence requires putting the ribbon machine into operation with the glass product under control and in usable form and other finishing machines successively brought up to speed. Position control will function as follows:

In the ribbon machine, four mechanical differentials operating from a line shaft provide the phase shifting necessary for position correction. Stepper motors are connected to the correction shaft of each mechanical differential. A comparator controller operates each of the stepper motors. The line shaft is driven from a synchronous electric motor that is variable in speed but at a selected production rate is operated at constant speed. The proper speed ratio of the drives is of course determined in the design and may include speed reducers, etc. not herein described. The pulse—error signal of the comparator controller involving two chains—operates the stepper motor on the differential of the drive for one of the chains to advance or retard the chain with respect to the machine with which the chain is being synchronized. As indicated, the pace setter of the process is the orifice plate chain of the ribbon machine. As it may be seen from the drawing (FIG. 14), flags 176 carried in corresponding movement with the rolls forming the spaced ribbon paddies are sensed as are flags 176 carried opposite the orifices of the orifice plate chain. The sensor signals resulting for each space (4 inches) of each element go to the comparator circuit of the controller which operates the stepper motor as needed to advance or retard the differential driving the feeder rolls. This will synchronize the paddies and orifices so that the paddies are correctly synchronized with the ribbon to lie over the orifices of the orifice plate chain. An example of the comparator controller usable is an ITL comparator controller manufactured by Reliance Electric Company, Cleveland, Ohio. Stepper motors usable in the system are Slo-Syn motors manufactured by Superior Electric Company.

Referring to FIG. 14, the drive system is diagrammatically shown. As feeder 12 of the glass furnace supplies a steady stream or flow of molten glass it passes between spaced rollers 13 and 14 to form the molten glass ribbon laid onto orifice plate chain 17 of the ribbon machine. The orifice plate chain is the pace setter of the process insofar as speed is concerned. A machine drive motor 101 is connected to electrical supply 102 for driving a line shaft 103. Gear box 104 is connected to shaft 103 and drive shaft 106 for driving the orifice plate chain. Gear box 105 is connected to shaft 103 and its output shaft 107 is connected to drive the differential gear box 108. The output shaft of differential 108 is connected to drive the paddy rolls 13 and 14.

Shaft 103 further supplies power to differential gear box 109 that is connected by shaft 110 to drive the blow head chain 21. The mold carriage 25 is driven by its connection with shaft 103 at differential gear box 111 and shaft 112. Pressurizer 26 has its link chain driven from power supplied at shaft 103 to differential gear box 113 and its output shaft 114 connected to a drive for the chain of the pressurizer. Similarly, the transfer machine is operated by shaft 103 coupled to differential gear box 115 through a shaft 116.

The machinery thus far described is automatically synchronized. The feed rolls include flags 176 moving past a sensor 117 that is connected to comparator controller 118 and flags on orifice chain 17 passing sensor 119 also connected to controller 118. The output of controller 118 is connected electrically to stepper motor 120. Motor 120 has its shaft coupled to the correction shaft 121 of differential 108.

Similarly, the blow heads are synchronized with the orifices by sensor 122 for blow head chain 21 connected to controller 123 as is sensor 124 along the orifice plate chain. The stepper motor 125 is operated by 123 and is coupled to correction shaft 126 for blow head differential 109.

The blow molds are synchronized with the orifices by sensor 127 for mold chain 25 connected to controller 128 as is a sensor 129 along the orifice plate chain. Stepper motor 130 is operated by 128 and is connected to the correction shaft 131 of mold carriage differential 111.

The pressurizer chain is synchronized with the orifices by a sensor 132 for the moving pressurizer heads connected to controller 133; and similar sensor 134 along the orifice plate chain goes to controller 133. Stepper motor 135 is operated by controller 133 and is coupled to correction shaft 136 for pressurizer differential 113.

The machinery to this point manufactures the containers in a continuous strip process. They are now advanced in a continuously moving line and therealong are finished to form the final article.

The transfer machine is synchronized with the containers on the ribbon to receive them as they are severed (cracked off).

The transfer chain 32 and its heads are synchronized with the orifices by a sensor 137 connected to controller 138. Flags 176 on heads 34 of the transfer machine pass sensor 137 in succession. Similarly, sensor 139 along orifice plate chain 17 is connected to controller 138 and the stepper motor 140 connected to correction shaft 141 of transfer differential 115.

The burn-off machine is synchronized with transfer machine by sensor 142 to the burn-off conveyor 38 connected with controller 143, as is sensor 144 along conveyor 32 of the transfer machine. Again, flags 176 are provided at the center spacing—4 inches—on each chain. Controller 143 is electrically connected to operate stepper motor 145. Burn-off machine is driven by a synchronous electric motor 146 that has its drive connected to a mechanical differential 147, the output shaft 148 of the latter being connected to drive the burn-off conveyor. Stepper motor 145 is coupled to the correction shaft 149 of differential 147.

Burn-off and heat treatment conveyors 38 and 47, respectively, are synchronized by having sensor 150 along the heat treating conveyor and sensor 151 along the burn-off conveyor. The sensors are connected to controller 152. Synchronous electric motor 153 is coupled to mechanical differential 154 and the output shaft 155 of the latter drives the heat treatment machine conveyor. Controller 152 is electrically connected to operate stepper motor 156, the latter being connected to the correction shaft 157 of heat treatment differential 154.

The second transfer machine is driven by its synchronous electric motor 158 connected to mechanical differential 159 and the output shaft 160 thereof coupled to drive the transfer conveyor 57. This conveyor is synchronized with heat treatment conveyor 38 by a similar technique, i.e. sensor 161 along the heat treat conveyor and sensor 162 along the transfer conveyor connect to controller 163 that is electrically connected to operate stepper motor 164 coupled to the correction shaft 165 of transfer differential 159.

The assembly machine has a synchronous electric motor 166 connected to mechanical differential 167 through shaft 168. Sensor 169 along transfer conveyor 57 leads to controller 170 as does sensor 171 along assembly conveyor 66. Controller 170 is connected to operate stepper motor 172 which is coupled to correction shaft 173 of the assembly differential 167.

Bases are supplied to the assembly machine (assembly zone) by a base delivery conveyor under control of electric motor 174 and coupling shaft 175.

In the described drive system, phase shifting for synchronization of the line is basically by mechanical differentials adjusted in phase shift by stepper motors under control of the various comparator controllers.

An equivalent result may be achieved by the phase shifting technique wherein the electrical phase of an inverter output is shifted. The latter is a recognized electrical technique known to those skilled in the art for the type of synchronization result above outlined. This replaces the various mechanical differentials.

It is also worth noting that a different concept of position synchronization is available, wherein synchros or optical encoders are affixed to sprockets near the point of transfer between the various machines. This should result in a lower cost and less complex unit.

The several motors of the total drive system 101, 146, 153, 158, 166 and 174 are regulated to run at synchronized speeds by known speed controls (not shown). For simplicity of illustration, these motors are shown herein as electrically connected to line current at terminals 102. The described drive system provides a drive means connected to operate the several machines of the container manufacturing system in synchronism to produce product from material received from the glass furnace and its feeder in a continuous strip and the succession of equally spaced quantities of material therein until the finished product is completed and assembled with an auxiliary component, in this case the plastic bases applied to provide the glass container with a stable base as shown on FIG. 17.

THERMAL HISTORY OF THE GLASS

The glass making materials consisting of sand, soda-ash, alumina, calcium and the like are fed to a glass making furnace wherein they are fused and fined to a molten glass at temperatures in the range of 2600 to 2750° F. Thereafter, the glass is cooled in a controlled manner in the conditioning chamber of forehearth 11 (FIG. 1) and fed from the orifice of feeder 12 at temperatures on the order of 2000–2025° F.

As the glass of the ribbon 15 is progressively shaped, the temperature decreases to about 1500° F. at the time the ware B is separated from the ribbon. During transfer by the transfer machine 31 to the burn-off machine 39 the glass cools further to around 900° F. and may continue to cool to somewhat lower temperature during the time the moile is burned off in the burners 43. The bank of heaters 182, 183 will control this cooling rate and some radiant heat of the burn-off burners will slow the cooling of the glass. In any event, at the time the ware is transferred from the burn-off machine 39 to the heat treat machine 44, the glass of the ware will have cooled to a temperature below 900° F.; more likely near 800° F. The rim R, due to burn-off and fire-polishing (finishing), will be somewhat hotter because of the mass of the bead formation of the rim finish.

In the heat treat machine 44, the burner section 51 will increase the temperature of the glass at the lower end of the ware to about 1220 to 1300° F. in the span of burners provided. Thereafter, the cooling nozzles in cooling section 55 of the machine will cool the lower end of the glassware below 900° F. The heat balance of the glass wall of hollow ware B at the time it is transferred to the second transfer machine 56 will be at a temperature below 500° F. and when the ware traverses the path whereat surface treating nozzles 62 apply the polymer surface treatment, the glass is near 350° F.

Next the ware transfers to the assembly machine 65 and as the base fitments F are placed onto the upturned closed ends of the ware, the glass is at a temperature in the range of 180–250° F. This latent heat of the glass derived from forming at the closed bulb end thereof will aid the reaction of activating the adhesive ring in the base fitment to unite and bond the base on the ware. After uniting, the composite containers are deposited onto the lower conveyor 77 and the glass is then at a temperature of 100–150° F. Thereafter, the glass will assume ambient temperature for the first time in its history.

The point to note is, the present invention provides for performing the several steps of forming, finishing and fabricating while the glass is cooling from about 2000° F. down to about 150° F.

The manufacturing process herein described is suited to high rates of production, on the order of 400–1000 containers per minute of medium size container ware, say 10–12 oz. capacity. At the production rate of 600 pieces per minute, from the time the glass leaves the feeder until the container is on the discharge conveyor 77 (FIG. 1), about 4½ minutes have elapsed.

Having described one exemplary form of our invention, it should be apparent to those skilled in the art that the disclosed embodiment may be modified to make a wide range of glassware articles and fitments for composite article manufacture; and efficiently produce at high rates of production a wide range of glassware items having utility in composite articles or of sole utility as glassware. Therefore, the foregoing description is to be considered exemplary rather than limiting, and the true scope of the invention is that defined in the appended claims.

We claim:

1. A glassware manufacturing system comprising in combination a glass ribbon forming machine receiving molten glass in ribbon form moving longitudinally along said machine and forming a succession of glassware articles integral with and dependent from the said ribbon, means at a first position along the path of movement of said ribbon for successively severing said formed articles from the ribbon, a burn-off machine having elongate burner means, an endless conveyor with plural, uniformly spaced, rotatable container chucks thereon linked together into an endless chain and movable past the burner means, means on said burn-off machine for engaging and rotating the chucks in movement past said burner means, and a transfer means having an endless transfer conveyor comprising a plurality of uniformly spaced apart ware engaging tongs movable along a first path, a portion thereof extending past said first position on the path of said ribbon and a separate portion thereof extending along said burn-off conveyor remote from said burner means, means on said transfer means for operating said tongs to grasp ware severed from the ribbon and release ware to said burn-off conveyor and means on said burn-off machine operably engaging said chucks for receiving ware from the transfer tongs and for unloading ware from said chucks after movement by the conveyor beyond said burner means.

2. The manufacturing system of claim 1, wherein said system is integrally operated by a drive means connected to each said machine and said transfer means and control means connected to each of said machines and said drive means for controlling said drive means to integrally operate said components of the system in synchronism.

3. The glassware manufacturing system of claim 1, having means for inspecting the ware on the tongs of the transfer conveyor and means operated in response to the inspection means for segregating ware that is defective from the ware released to the burn-off conveyor.

4. The glassware manufacturing system of claim 1, having means on said transfer machine for applying a surface coating to glassware on the tongs of the transfer conveyor.

5. The glassware manufacturing system of claim 1, having an inspection means on the burn-off machine for inspecting the open end of the glassware after it is conveyed past the burner means and means operated in response to said inspection means for thereafter removing ware that is defective from the burn-off conveyor.

6. The glassware manufacturing system of claim 1, including a heat treating machine having heating means for heating glassware, cooling means for applying coolant to said heated glassware and an endless glassware conveyor with spaced container supporting means movable respectively past said heating means and cooling means, said conveyor receiving ware from the burn-off conveyor.

7. The glassware manufacturing system of claim 6, including a second transfer means having an endless transfer conveyor movable along said heat treating conveyor including chucks at spaced points thereon and mounted on said transfer conveyor for movement for engaging glassware on the heat treating conveyor and supporting same to convey the glassware away from said heat treating conveyor.

8. The glassware manufacturing system of claim 7, having inspection means for inspecting glassware on the chucks of said second transfer conveyor, and means connected to the chucks and operated in response to the inspection means for ejecting selective glassware therefrom that is defective.

9. The glassware manufacturing system of claim 8, having means on said second transfer means for applying a fluid surface coating material onto the surface of glassware held by its said chucks.

10. The glassware manufacturing system of claim 7, including a glassware assembly machine having a feed device for supplying fitments for assembly onto the glassware, an endless conveyor with spaced glassware holding means receiving glassware from said second transfer means, the conveyor and holding means being driven for movement past said feed device, each glassware article receiving a fitment from said feed device, means for progressively assembling the fitment onto the glassware article during movement away from said feed device, the movement of the conveyor beyond said assembly means releasing the assemblage of glassware and fitment from the glassware holding means.

11. The glassware manufacturing system of claim 10, including drive means, means connecting said drive means to individually drive the transfer machine conveyor, burn-off machine conveyor, heat treating conveyor, second transfer conveyor and assembly conveyor in unison, flag means carried on each said conveyor, a sensor means mounted in stationary relationship along each said conveyor, control means connected to said sensor means, the sensor means sensing movement and position of said flag means of each said conveyor and providing a response signal to said control means, and means interconnected to the control means and operated in response thereto and to the drive means for individually regulating the relative position of each of the said conveyors to automatically synchronize their movement in operation of said manufacturing system.

12. The glassware manufacturing system of claim 11, wherein said flag means comprises a series of flag members connected at equally spaced distances along each of said conveyors and carried thereby, and said sensor means includes a pick up sensor mounted along each said conveyor whereby said flag members on said conveyor serially move in close proximity past said pick up sensor.

13. The glassware manufacturing system of claim 10, wherein the glassware holding means comprises a series of inverted pocket-like holders each having a lower end surface for engaging the open end of said glassware and supporting the latter in inverted position with its lower bulbous end upright and projecing above the holders, said feed device supplying cup-like base fitments in inverted position overlying the bulbous end of the glassware passing therebeneath, the glassware holders being connected to the assembly conveyor at longitudinally equally spaced distances therealong, whereby in their advancing movement past said feed device the glassware each engages a fitment and carries it with said glassware and elongated means overlying the holders adjacent said feed device for engaging the upper end of the fitments and telescopically seating them in succession onto the bulbous end of the glassware in assembled position on the latter.

14. The glassware manufacturing system of claim 13, including elongated cooling means attached to the assembly machine adjacent said elongated means and underlying the glassware holders thereof, said cooling means applying coolant onto the glassware to cool the glassware and fitment assembly after said fitment is in assembled position on the glassware.

15. A container manufacturing system comprising in combination a glass ribbon forming machine receiving molten glass in ribbon form and forming glass container articles having a lower bulbous end an an open upper end dependent from the ribbon, means for severing said formed containers in succession from the ribbon, a transfer machine having an endless transfer conveyor movable along said ribbon, a burn-off machine having burner means, an endless conveyor with spaced, rotatable container chucks movable past the burner means, means for rotating the chucks in movement past said burner means, the transfer machine operable for releasing containers to said burn-off machine conveyor, an assembly machine including conveyor means carrying container base components, a container carriage including a series of container supports, movable past said base conveyor, means for transferring containers successively from the burn-off machine conveyor to the container carriage supports, means for transferring the bases in succession from said base conveyor to containers of said container carriage as it moves past the base conveyor, and means on the assembly machine engaging said transferred bases for assembling same onto the bulbous end of the containers, thereby forming a container-base assembly having a stable bottom end.

16. The method of forming seamless, hollow articles of glass comprising forming a continuous ribbon of molten glass from a body thereof, supporting the ribbon on a horizontal apertured first conveyor moving away from the body of glass, settling glass of said ribbon through said spaced apertures to depend from said conveyor and forming the depending glass in molds to the shape of seamless, hollow articles integral with said ribbon as the latter moves away from said body, severing the depending articles from the ribbon and, concurrently with severing, grasping the articles by individual holders spaced along a second moving conveyor traveling with the ribbon, said holders being spaced apart alike with the spacing of articles on said ribbon, conveying the severed articles away from the ribbon to a third conveyor traveling in a path overlapping with a part of the path of said second conveyor, transferring the articles in succession to equally spaced apart holders on the third conveyor, said third conveyor moving away from said overlapping path and through a burn-off zone whereat an end portion of each article is successively and progressively severed by heat applied in a narrow annular band thereof as each of said articles move in a horizontal path through said zone, said severed end portions separating successively and falling vertically from said horizontal path of the articles.

17. The method of forming glass containers comprising molding a succession of containers from a formible glass ribbon on a ribbon machine, the mold containers depending in upright position at spaced intervals along the ribbon of glass moving horizontally along the machine, the molded containers including an upper moile end portion connected to the ribbon, separating the moile end from the ribbon, supporting the containers by the moile portion in upright position on container holders horizontally spaced on a transfer machine, conveying the containers away from the ribbon, transferring the containers to holders on a container finishing conveyor and supporting them by the holders at points below the moile portion, moving the containers through a moile severing zone in an inverted position and in a horizontal linear path through a flame severing device, simultaneously rotating the containers during said movement whereat the moile end portion of each container is severed therefrom and caused to separate therefrom, thereby forming a mouth end on the containers, and subsequent to severing, further moving and rotating said containers through a reshaping zone whereat the finish end of the containers is reshaped by application of flame heating to form the finish rim configuration about the container mouth.

18. A container manufacturing system comprising in combination a glass ribbon forming machine for forming a succession of containers integral with and dependent from a moving glass ribbon, means at a first location on the path of movement of said ribbon for successively severing formed containers from the ribbon, a first transfer machine having a plurality of transfer tongs mounted in uniformly spaced succession for movement along a first endless path extending past said first location, a burn-off machine having elongate burner means, a plurality of uniformly spaced chucks on said burn-off machine linked together into an endless chain and mounted for movement along a second endless path having a first portion extending along said first endless path and a second portion extending longitudinally past said burner means, means on said burn-off machine engageable with said chucks to rotate the chucks and containers supported thereon during transit of said second portion of said second endless path, a heat-treat machine having elongate heating means and elongate cooling means, endless conveyor means on said heat-treat machine mounted for movement along a third endless path having a first portion extending along said second endless path downstream of said burner means, a second portion extending longitudinally through said heating means and a third portion extending longitudinally through said cooling means, means on said endless conveyor means for receiving containers from said burn-off machine and conveying the containers along said third endless path successively past the second and third portions thereof, a second transfer machine having a plurality of uniformly spaced container chucks mounted for movement along a fourth endless path having a first portion overlapping said third endless path between the third and first portions thereof, means connected to said container chucks for grasping successive containers from said heat-treat machine in said overlapping portion of the third and fourth endless paths and conveying the grasped container to a second location on said fourth endless path, an assembly machine having a plurality of uniformly spaced container supports mounted for movement along a fifth endless path extending past said second location, container base supply means for supplying container bases to containers moving along said fifth endless path as the containers are advanced past an assembled location on said fifth endless path, and means on said assembly machine downstream of said assembly location for aligning and bonding the bases in assembled positions on the containers.

19. Apparatus for finishing and treating formed glass envelopes having a moile portion defining an end opening into containers, comprising a burn-off machine having elongate burner means, endless conveyor means on said burn-off machine including plural spaced chucks for supporting envelopes, said conveyor means mounted for movement along a first endless path having a first portion and a second portion extending longitudinally past said burner means, means on said burn-off machine engageable with said chucks to rotate the latter and envelopes thereon during transit of said second portion of said endless path, means for supplying envelopes to said burn-off chucks in said first portion of the first endless path of said conveyor, the moile portion being separated from the remainder of the envelope during transit in said second portion of said path past said burner means to form said container, a heat-treat machine having elongate heating means and elongate cooling means, endless conveyor means on said heat-treat machine mounted for movement along a second endless path having a first portion extending along said first endless path downstream of said burner means, a second portion extending longitudinally through said heating means and the third portion extending longitudinally through said cooling means, means on said endless heat-treat conveyor for receiving containers from said burn-off machine in said first portion of the second endless path and conveying the containers along said second endless path successively past the second and third portions thereof, a transfer machine having plural spaced container chucks mounted for movement along a third endless path having a first portion overlapping said second endless path between the third and first portions of the latter, means connected to said container chucks for grasping containers from said heat-treat machine in said overlapping first portion of the third endless path and conveying them to a second location on said third endless path.

20. The method defined by claim 16, wherein the formed glass articles are transferred to spaced annular chucks on a fourth conveyor, and said fourth conveyor is successively moved past a heating zone whereat only the lowermost finish portion of each of the articles are heated above the strain point temperature of the glass thereof and theerafter the articles are conveyed through a cooling zone whereat a cooling fluid is applied to the lowermost finish portion of the articles to establish a compressive stress in that portion of the article.

21. The method defined by claim 20, wherein the articles after they move through the cooling zone are successively grasped by their bulbular closed ends by spaced vacuum chucks carried on a fifth conveyor and transferred to the latter from the chucks of the fourth conveyor.

22. The method defined by claim 21, wherein the articles carried by the vacuum chucks on the fifth conveyor are carried through a surface treating zone whereat a surface treating compound is sprayed onto the outer surface of the articles.

23. The method defined by claim 21, wherein the articles are carried by the vacuum chucks of the fifth conveyor through an inspection zone whereat the glass wall of the article is inspected for defects and subsequently any such article found defective during the inspection is rejected.

24. The method defined by claim 21, wherein the articles carried by the vacuum chucks of said fifth conveyor are transferred to an underlying sixth conveyor and thereon supported in spaced apart holders in inverted position, the sixth conveyor moving the articles through an assembly zone whereat fitments are telescopically assembled onto the articles and affixed thereto.

25. The method defined by claim 24, wherein the movements of the apertured first conveyor, and the said second, third, fourth, fifth and sixth conveyors are respectively synchronized with each other for successively and progressively transferring articles from one to the other of said conveyors.

26. The methods defined by claim 16, wherein the grasped articles on the second conveyor are moved in upright position through a surface treating zone whereat a surface treating compound is applied over the article inclusive of the exterior wall surface thereof below the moile portion thereof.

27. In the apparatus of claim 19, the envelopes being supplied to the burn-off conveyor chucks and grasped thereby from their bottom ends in upright position, the conveyor means supporting the envelopes and moving them through said second portion of the first endless path in inverted position, whereat said inverted envelopes are rotated as they are moved past said burner means, the moile portion thereof being severed thereby and separated so as to drop freely from the envelopes.

28. In the apparatus of claim 27, the means on the heat-treat conveyor receiving containers from the burn-off conveyor chucks for supporting and conveying them in said second endless path in inverted position.

29. In the apparatus of claim 28, the container chucks of said transfer machine engaging the bottom ends of the inverted containers on the heat-treat conveyor and removing them from the latter for conveying them to said second location in inverted position.

30. In the apparatus of claim 29, wherein the means connected to the container chucks of said transfer machine comprises vacuum applying means and each of said chucks includes a vacuum cup engageable with the bottom end of the container, the vacuum applying means being operable to attach the container to the cup of the chuck.

31. In the apparatus of claim 29, an assembly machine having plural spaced container supports for holding containers in inverted position, said supports mounted on a conveyor for movement along a fourth endless path including a portion overlapping said second location on the third endless path, said transfer machine chucks releasing the inverted containers at said location for transfer to said container supports, supply means for supplying container component fitments to the inverted containers moving along said fourth endless path as the containers are advanced past an assembly location on said fourth endless path, and means on said assembly machine adjacent said assembly location for assembling the fitments onto the containers.

32. In the apparatus of claim 31, wherein the fitments comprise a cylindrical side wall and bottom wall defining a cup-like base fitment, the base fitments being supplied by said supply means to engage the bottom end of the inverted containers as they are advanced past the assembly location in said fourth endless path, said assembly means engaging the base fitments for aligning and securing said base fitments on the bottom end of the containers in assembled position.

33. In the apparatus of claim 19, the elongate burner means comprising plural burner sections for successively (1) severing the moile portion from the rest of the container and forming a rim defining the end opening of the container, and (2) reforming the glass rim to a bead-like finish at the end opening of the container while the containers are in transit through said second portion of said endless path on the burn-off machine.

34. In the apparatus of claim 33, wherein the envelopes are in inverted position during transit past said plural burner sections.

35. In the apparatus of claim 33, the plural burner sections comprising a first elongate bank of burners adjacent either side of the first endless path for the burn-off conveyor, said burners operated for preheating the moile portion of the envelopes during transit past said first burners, a second elongate bank of burners adjacent either side of said first endless path downstream from said first bank of burners for severing each of the moile portions in their preheated region from the rest of the envelopes, and thereafter forming the bead finish at the end of the containers during transit past said second bank of burners.

36. The method defined by claim 16, wherein the glass articles depending from the ribbon are carried with said ribbon past an inspection device whereat the physical characteristics of the depending glass configuration of each said article is inspected for defects of formation, and thereafter articles found defective from said inspection are separated from the ribbon and ejected prior to their point of severing therefrom and transfer to the second conveyor.

37. The method defined by claim 16, wherein the grasped articles are conveyed by said holders on the second conveyor through an inspection station and articles found defective from said inspection are physically ejected from said holders prior to the transfer of the articles to the holders of the third conveyor.

38. The method defined by claim 16, wherein the articles are inverted by the third conveyor and moved in succession thereafter through the burn-off zone and an inspecting zone along the path of the third conveyor after the moile of the article is severed and prior to the transfer point to the fourth conveyor, and any articles found to be defective are ejected from the linear path of said third conveyor prior to the transfer point to said fourth conveyor.

39. A container manufacturing system comprising in combination a glass ribbon forming machine for receiving molten glass in ribbon form from a furnace and feeder mechanism and forming bulbous glass container bodies dependent from the linear ribbon of glass moving away from said feeder, means on said machine for severing said formed container bodies in succession from the ribbon, a first transfer machine having an endless transfer conveyor movable along said ribbon and receiving severed container bodies from the forming machine, a burn-off machine having burner means, an endless conveyor with spaced container chucks movable in registry with container bodies on said transfer machine for receiving container bodies from the latter for moving them past the burner means, means on said burn-off machine for rotating the container bodies during movement past said burner means, a heat treating machine including elongated heating means, elongated cooling means and endless conveyor means for supporting container bodies at spaced point therealong movable in an endless path for successively carrying container bodies along said heating means and cooling means, a second transfer machine having an endless conveyor overlapping the heat treat machine conveyor for grasping container bodies on said heat treat conveyor in the overlap of said conveyors, an assembly machine including base conveyor means for carrying container base components, a container carriage including a series of container body supports movable past said base conveyor and overlapping the travel of said second transfer conveyor, means for transferring container bodies successively from the second transfer conveyor to the container carriage supports in said overlap, means for transferring the bases from said base conveyor to container bodies on said container carriage as it moves past the base conveyor, and means on the assembly machine engageable with said transferred bases for assembling same onto the bulbous end of the container bodies, thereby forming a container having a stable bottom end.

References Cited
UNITED STATES PATENTS

| | | | |
|---|---|---|---|
| 1,674,367 | 6/1928 | Kehl | 65—269 X |
| 1,790,397 | 1/1931 | Woods et al. | 65—184 X |
| 1,943,195 | 1/1934 | Ness | 65—184 |
| 2,280,167 | 4/1942 | Soubier | 65—264 X |
| 2,280,268 | 4/1942 | Schutz | 65—269 X |
| 3,338,698 | 8/1967 | Morris | 65—184 |
| 3,372,826 | 3/1968 | Heaton | 65—87 X |

ROBERT L. LINDSAY, JR., Primary Examiner

U.S. Cl. X.R.

65—69, 81, 184, 239, 264, 266

PO-1050
(5/69)

UNITED STATES PATENT OFFICE
CERTIFICATE OF CORRECTION

Patent No. 3,703,363      Dated November 21, 1972

Inventor(s) R. A. Heaton and J. D. Mallory

It is certified that error appears in the above-identified patent and that said Letters Patent are hereby corrected as shown below:

```
Col. 3,  line 14,  "suporting" should be --supporting--;
         line 61,  "is" should be --in--;
Col. 5,  line 26,  "controler" should be --controller--;
         line 45,  "11" should be --15--;
         line 75,  "move" should be --moves--;
Col. 6,  line 39,  "operatve" should be --operative--;
         line 66,  "350°F." should be --1350°F.--;
Col. 9,  line 62,  "asembled" should be --assembled--;
Col. 14, line 25,  "facting" should be --facing--;
         line 70,  "diaphrgm" should be -- diaphragm--;
         line 71,  "chember" should be --chamber--;
Col. 16, line 3,   "257" should be --247--;
Col. 23, line 30,  (Claim 9), "8" should be --7--;
Col. 24, line 73,  (Claim 17), "mold" should be --molded--;
Col. 25, line 65,  (Claim 18), "assembled" should be --assembly--;
Col. 26, line 72,  (Claim 26), "methods" should be --method--;
Col. 27, line 34,  (Claim 31), after "said" insert --second--.
```

Signed and sealed this 29th day of May 1973.

(SEAL)
Attest:

EDWARD M. FLETCHER, JR.
Attesting Officer

ROBERT GOTTSCHALK
Commissioner of Patents